(12) United States Patent
Mayer et al.

(10) Patent No.: US 7,682,498 B1
(45) Date of Patent: *Mar. 23, 2010

(54) ROTATIONALLY ASYMMETRIC VARIABLE ELECTRODE CORRECTION

(75) Inventors: Steven T. Mayer, Lake Oswego, OR (US); John S. Drewery, Santa Clara, CA (US)

(73) Assignee: Novellus Systems, Inc., San Jose, CA (US)

( * ) Notice: Subject to any disclaimer, the term of this patent is extended or adjusted under 35 U.S.C. 154(b) by 1289 days.

This patent is subject to a terminal disclaimer.

(21) Appl. No.: 11/179,984

(22) Filed: Jul. 11, 2005

Related U.S. Application Data

(63) Continuation-in-part of application No. 10/916,374, filed on Aug. 10, 2004, now Pat. No. 6,919,010, and a continuation-in-part of application No. 10/154,082, filed on May 22, 2002, now Pat. No. 6,773,571.

(60) Provisional application No. 60/580,572, filed on Jun. 16, 2004, provisional application No. 60/302,111, filed on Jun. 28, 2001.

(51) Int. Cl.
| | |
|---|---|
| B23H 3/00 | (2006.01) |
| C25D 5/00 | (2006.01) |
| C25D 5/18 | (2006.01) |
| C25D 17/10 | (2006.01) |
| B23H 7/14 | (2006.01) |
| C25D 21/12 | (2006.01) |

(52) U.S. Cl. .................. 205/640; 205/96; 205/97; 205/104; 205/291; 205/292; 205/646; 204/199; 204/218; 204/230.2; 204/242; 204/280

(58) Field of Classification Search .................. 205/96, 205/97, 640, 646, 104, 291, 292; 204/199, 204/218, 230.2, 242, 280
See application file for complete search history.

(56) References Cited

U.S. PATENT DOCUMENTS

| | | | |
|---|---|---|---|
| 3,652,442 | A | 3/1972 | Powers et al. |
| 3,706,651 | A | 12/1972 | Leland |
| 3,862,891 | A | 1/1975 | Smith |

(Continued)

FOREIGN PATENT DOCUMENTS

| | | |
|---|---|---|
| EP | 0037325 | 3/1981 |
| JP | 59-162298 | 9/1984 |
| JP | 09-53197 | 2/1997 |
| JP | 2001316887 | 11/2001 |
| WO | WO/9941434 | 8/1999 |

OTHER PUBLICATIONS

Mayer et al., Electrochemical Treatment of Integrated Circuit Substrates Using Concentratic Anodes and Variable Field Shaping Elements, U.S. Appl. No. 10/116,077, filed Apr. 2, 2002, 84 pages.

Fang et al., "Uniform Copper Electroplating on Resistive Substrates," Abs. 167, 205$^{th}$ Meeting, © 2004 The Electrochemical Society, Inc., 1 page.

*Primary Examiner*—Harry D. Wilkins, III
*Assistant Examiner*—Nicholas A. Smith
(74) *Attorney, Agent, or Firm*—Weaver Austin Villeneuve & Sampson LLP

(57) ABSTRACT

A work piece is electroplated or electroplanarized using an azimuthally asymmetric electrode. The azimuthally asymmetric electrode is rotated with respect to the work piece (i.e., either or both of the work piece and the electrode may be rotating). The azimuthal asymmetry provides a time-of-exposure correction to the current distribution reaching the work piece. In some embodiments, the total current is distributed among a plurality of electrodes in a reaction cell in order to tailor the current distribution in the electrolyte over time. Focusing elements may be used to create "virtual electrode" in proximity to the surface of the work piece to further control the current distribution in the electrolyte during plating or planarization.

41 Claims, 12 Drawing Sheets

U.S. PATENT DOCUMENTS

| | | |
|---|---|---|
| 4,033,833 A | 7/1977 | Bestel et al. |
| 4,082,638 A | 4/1978 | Jumer |
| 4,240,886 A | 12/1980 | Hodges et al. |
| 4,272,335 A | 6/1981 | Combs |
| 4,304,641 A | 12/1981 | Grandia et al. |
| 4,469,564 A | 9/1984 | Okinaka et al. |
| 4,604,177 A | 8/1986 | Sivilotti |
| 4,604,178 A | 8/1986 | Fleegener et al. |
| 4,605,482 A | 8/1986 | Shiragami et al. |
| 4,696,729 A | 9/1987 | Santini |
| 4,828,654 A | 5/1989 | Reed |
| 4,906,346 A | 3/1990 | Hadersbeck et al. |
| 4,931,149 A | 6/1990 | Stierman et al. |
| 4,933,061 A | 6/1990 | Kulkarni et al. |
| 5,039,381 A | 8/1991 | Mullarkey |
| 5,096,550 A | 3/1992 | Mayer et al. |
| 5,146,136 A | 9/1992 | Ogura et al. |
| 5,156,730 A | 10/1992 | Bhatt et al. |
| 5,162,079 A | 11/1992 | Brown |
| 5,217,586 A | 6/1993 | Datta et al. |
| 5,316,642 A | 5/1994 | Young, Jr. et al. |
| 5,368,711 A | 11/1994 | Poris |
| 5,391,285 A | 2/1995 | Lytle et al. |
| 5,421,987 A | 6/1995 | Tzanavaras et al. |
| 5,443,707 A | 8/1995 | Mori |
| 5,472,592 A | 12/1995 | Lowery |
| 5,476,578 A | 12/1995 | Forand |
| 5,498,325 A | 3/1996 | Nishimura et al. |
| 5,516,412 A | 5/1996 | Andricacos et al. |
| 5,567,300 A | 10/1996 | Datta et al. |
| 5,935,402 A | 8/1999 | Fanti |
| 6,027,631 A | 2/2000 | Broadbent |
| 6,132,587 A | 10/2000 | Jorne et al. |
| 6,193,860 B1 | 2/2001 | Weling |
| 6,391,166 B1 | 5/2002 | Wang |
| 6,395,152 B1 | 5/2002 | Wang |
| 6,402,923 B1 | 6/2002 | Mayer et al. |
| 6,497,801 B1 | 12/2002 | Woodruff et al. |
| 6,527,920 B1 | 3/2003 | Mayer et al. |
| 6,755,954 B2 | 6/2004 | Mayer et al. |
| 6,773,571 B1 | 8/2004 | Mayer et al. |
| 2003/0029527 A1 | 2/2003 | Yajima et al. |
| 2003/0102210 A1 | 6/2003 | Woodruff et al. |
| 2004/0065540 A1 | 4/2004 | Mayer et al. |

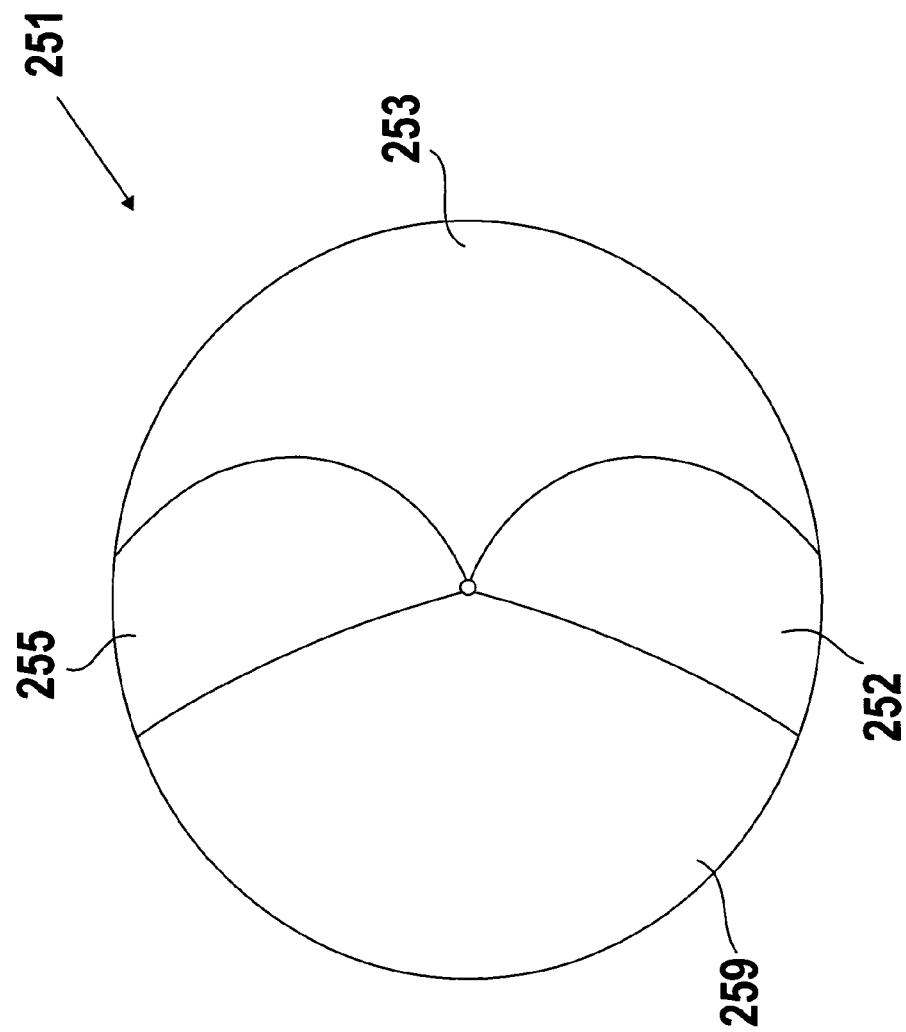

ROTATIONALLY ASYMMETRIC VARIABLE ELECTRODE CORRECTION

CROSS REFERENCE TO RELATED APPLICATIONS

This application is a continuation-in-part of U.S. patent application Ser. No. 10/916,374, filed Aug. 10, 2004, now U.S. Pat. No. 6,919,010, naming Steven T. Mayer as inventor and titled "Uniform Electroplating Of Thin Metal Seeded Wafers Using Rotationally Asymmetric Variable Anode Correction," which in turn claims benefit under 35 USC 119(e) from U.S. Provisional Application No. 60/580,572, naming Steven T. Mayer as inventor, filed Jun. 16, 2004, and titled, "Method of Depositing a Diffusion Barrier For Copper Interconnect Applications." U.S. patent application Ser. No. 10/916,374 is also a continuation in part of U.S. patent application Ser. No. 10/154,082, filed May 22, 2002 (now U.S. Pat. No. 6,773,571, issued Aug. 10, 2004) naming Steven T. Mayer et al. as inventors, and titled, "Method And Apparatus for Uniform Electroplating of Thin Metal Seeded Wafers Using Multiple Segmented Virtual Anode Sources," which, in turn, claims priority under 35 USC 119(e) from U.S.U.S. Provisional Application No. 60/302,111, naming Steve Mayer et al. as inventors, filed Jun. 28, 2001, and titled "Method and Apparatus for Uniform Electroplating of Thin Metal Seeded Wafers Using Multiple Segmented Virtual Anode Sources." Each of these patent documents is incorporated herein by reference for all purposes.

BACKGROUND

The present invention pertains to methods and apparatus for electrochemically processing a work piece. More specifically, the invention pertains to methods and apparatus for controlling the electrical resistance and current flow characteristics in an electrolyte environment encountered by the work piece during electrochemical processing.

The transition from aluminum to copper required a change in process "architecture" (to damascene and dual-damascene) as well as a whole new set of process technologies. One process step used in producing copper damascene circuits is the formation of a "seed-" or "strike-" layer, which is then used as a base layer onto which copper is electroplated ("electrofill"). The seed layer carries the electrical plating current from the edge region of the wafer (where electrical contact is make) to all trench and via structures located across the wafer surface. The seed film is typically a thin conductive copper layer. It is separated from the insulating silicon dioxide or other dielectric by a barrier layer. The seed layer deposition process should yield a layer that has good overall adhesion, excellent step coverage (more particularly, conformal/continuous amounts of metal deposited onto the side-walls of an embedded structure), and minimal closure or "necking" of the top of the embedded feature.

Market trends of increasingly smaller features and alternative seeding processes drive the need for a capability to plate with a high degree of uniformity on increasingly thinner seeded wafers. In the future, it is anticipated that this film will become increasingly thin and may simply be composed of a plate-able barrier film, such as ruthenium, or a bilayer of a very thin barrier and copper (deposited, for example, by an atomic layer deposition (ALD) or similar process). These films present the engineer with an extreme terminal effect situation. For example, when driving a 3 amp total current uniformly into a 30 ohm per square ruthenium seed layer (a likely value for a 30-50 Å film) the resultant center to edge voltage drop in the metal will be over 2 volts.

FIG. 1 is a schematic of an approximated equivalent electrical circuit for the problem. It is simplified to one dimension for clarity. The continuous resistance in the seed layer is represented by a set of finite (in this case four) parallel circuit elements. The in-film resistor elements $R_f$, represent the differential resistance from an outer radial point to a more central radial point on the wafer. The total current supplied at the edge, $I_t$ is distributed to the various surface elements, $I_1$, $I_2$, etc., scaled by the total path resistances with respect to all the other resistances. The circuits more centrally located have a larger total resistance because of the cumulative/additive resistance of the $R_f$ for those paths. Mathematically, the fractional current $F_i$ through any one of the surface element paths is $$F_i = \frac{I_i}{I_t} = \frac{Z_T}{Z_i} = \frac{\frac{1}{(iR_f + R_{ct,i} + W_i + R_{el,i})}}{\sum_1^n \frac{1}{iR_f + R_{ct,i} + W_i + R_{el,i}}} \quad (1)$$

where the subscripts i refer to the $i^{th}$ parallel current path and T to the total circuit, I is current, Z is overall (path) resistance, $R_f$ is the resistance in the metal film between each element (constructed, for simplicity, to be the same between each adjacent element), $R_{ct}$ is the local charge transfer resistance, $Z_w$ is the local diffusion (or Warburg) impedance and $R_{el}$ is the electrolyte resistance. With this, $I_i$ is the current to through the $i^{th}$ surface element pathway, and $I_t$ is the total current to the wafer. The charge transfer resistance at each interfacial location is represented by a set of resistors $R_{ct}$ in parallel with the double layer capacitance $C_{dl}$, but for the steady state case the capacitance does not effect the current distribution. The diffusion resistances, represented by the Warburg impedance (symbol $Z_w$) and the electrolyte resistance ($R_{el}$) are shown in a set of parallel circuit paths, all in series with the particular surface element circuit, give one of several parallel paths for the current to traverse to the anode. In practice, $R_{ct}$ and $Z_w$ are quite non-linear (depending on current, time, concentrations, etc.), but this fact does not diminish the utility of this model in comparing how the current art and this disclosure differ in accomplishing uniform current distribution. To achieve a substantially uniform current distribution, the fractional current should be the same, irrespective of the element position (i). When all terms other than the film resistance term, $R_f$, are relatively small, the current to the $i^{th}$ element is $$F = \frac{\frac{1}{i}}{\sum_1 \frac{1}{i}} \quad (2)$$

Equation 2 has a strong i (location) dependence and results when no significant current distribution compensating effects are active. In the other extreme, when $R_{ct}$, $Z_w$, $R_{el}$ or the sum of these terms are greater than $R_f$, the fractional current approaches a uniform distribution (F=1/i).

Classical means of improving plating non-uniformity draw upon (1) increase $R_{ct}$ through the use of charge transfer inhibitors (e.g., plating suppressors and levelers, with the goal of creating a big normal-to-the-surface voltage drop, making $R_f$ small with respect to $R_{ct}$) or (2) very high ionic electrolyte resistances (yielding a similar effect though $R_{el}$) or (3) creating a significant diffusion resistance ($Z_w$).

These approaches have significant limitations related to the physical properties of the materials and the processes. Typical surface polarization derived by organic additives cannot create polarization in excess of about 0.5V (which is a relatively small value in comparison to seed layer voltage drop that must be compensated). Also, because the conductivity of a plating bath is tied to its ionic concentration and pH, decreasing the conductivity directly and negatively impacts the rate of plating and morphology of the plated material.

Beyond the classical approaches, at least three other approaches have been pursued in the area of terminal effect compensation. The first class increases the electrolyte resistance (or effective resistance by interposing a membrane in the electrolyte between the anode and cathode). The second class alters the effective ionic path resistance $R_{el}$ for different current path elements (i.e., it provides a non-uniform $R_{el}$ in the radial direction) in order to balance the resistance in the film with that external to the film. Some current shielding and concentric multiple anode source approaches fall into this solution class. Asymmetrical shielding elements have been examined as a way to change (tailor) the composite plating process uniformity. The change in plating current was estimated as the time averaged exposure that a rotating wafer would "see" with a mask of a certain shape and size covering the part during a rotational period. A third class utilizes a time averaging exposure effect (for example, with a rotating wafer and a current shield element) to, over time, plate the same thickness at all locations. See U.S. Pat. No. 6,027,631 issued to Broadbent et al. on Feb. 22, 2000, which is incorporated herein by reference for all purposes.

While the approaches discussed above have proven useful, they suffer a number of potential limitations such as (1) the inability to continuously (throughout the process) change the resistance compensation as appropriate when the thickness of the plated layer grows and thereby reduces the electronic resistance, (2) a high cost of implementation, and/or (3) mechanical limitations (e.g., excess number of moving parts in a corrosive bath, material compatibility limitations, or reliability). Furthermore, the above approaches are not all easily adaptable/integrateable to particularly desirable apparatus configurations such as microcell configurations, a newly developed and desirable class of plating cells. See US Patent Publication No. 2004/0065540 (Mayer et al.), titled "Liquid Treatment Using Thin Liquid Layer," and published Apr. 8, 2004, which is incorporated herein by reference for all purposes. This class of electrochemical reactors (employed for either for deposition or removal) typically has the counter electrode (or the limits of the field shaping element, often referred to as the plane of a virtual counter electrode element) in close proximity to the surface being processed.

In addition to the issues associated with electroplating on seed layers, other problems arise when the incoming work piece surface has a non-uniform radial thickness distribution (e.g., center thick or edge thick). Ideally, plating on such surfaces would improve the planarity of the work piece surface by reducing or eliminating the non-uniformity. Yet another issue arises in processes for electrochemically removing metal from a work piece surface, e.g., electropolishing, electrochemical mechanical polishing or any other electrochemical etching or planarization technique. During processing, as more metal is removed from the work piece surface, resistance from the periphery to the center of the workpiece increases and a terminal effect may result, causing material to be removed from the center of the work piece at a lower rate in comparison to material removed at the edges of the work piece. Further, the surface layer in incoming work pieces processed for electrochemical material removal may have global thickness variations such as dishing.

What is needed therefore is an improved technique for electrochemically processing work pieces requiring globally non-uniform processing; e.g., electroplating onto thin-metal seeded wafers, particularly wafers with large diameters (e.g. 300 mm).

SUMMARY

The present invention pertains to methods and apparatus for electrolytic deposition and removal, e.g. electroplating, electropolishing, electrochemically planarizing, electrolytic etching, etc. a work piece such as a semiconductor wafer having partially fabricated integrated circuits thereon. The ionic current in an electrolytic cell is provided by an azimuthally asymmetric electrode that is aligned with the work piece. The electrode is shaped so that when the work piece is rotated with respect to the electrode current source, the ionic current (as delivered from the electrode) is non-uniformly distributed in the radial direction and is concentrated toward the center or edge of the work piece (when averaged over the period of rotation). The motion of rotation with respect to the electrode does not have to be purely rotational about a single axis, but can be, for example, orbital, or even have a more complex motion. In certain embodiments, the workpiece repeats the rotational cycle definable to a centroid with respect to the position of the counter electrode.

With this invention the current may be tailored to compensate for resistance and voltage variation across a work piece due to the thin seed layer during initial phases of plating or a thin remaining copper layer during the latter phases of electropolishing, for example. In another example, the current distribution is tailored to compensate for a non-uniform radial distribution (center thick or edge thick) on the surface layer (or underlying layer) of a work piece or to create such a thickness distribution, as the needs may require. Insulating walls (sometimes called focusing elements) around the edge of the asymmetric electrode and extending toward the work piece may be employed to create a "virtual electrode" in proximity to the plating surface of the work piece to further control the current distribution in the electrolyte during plating or material removal. Alternatively, the electrode itself can be placed in close proximity to the workpiece. In certain embodiments, the separation distance between the work piece and the electrode (or virtual electrode) is not greater than about a characteristic length of the work piece (e.g., a wafer diameter), or not greater than about one half of the characteristic length, or not greater than about one quarter of the characteristic length.

Some embodiments of the invention allow the radial distribution of ionic current to adjust over time to accommodate changes in the condition of the work piece. For example, as the thickness of a plated layer increases, the effects of metal sheet resistance decrease such that the electronic current becomes less variant in the radial direction. Hence it becomes less necessary that an asymmetric anode provide radially non-uniform ionic current. At some point in the process, virtually no current correction at all may be required. The sequence is typically reversed during metal removal processes (see below). To address this some embodiments of the invention provide one or more other anode segments, in addition to the azimuthally asymmetric anode described above. These are isolated from one another and from the asymmetric anode so that they can serve as separate current sources to be turned on at different times as plating progresses and used to gradually equalize the radial current distribution provided by the anode sources. To protect against an abrupt change in current distribution, the additional anode segments can be turned on gradually by gradually increasing the level of current provided from them. Alternatively, they can be turned on gradually by initially pulsing the delivered current with a relatively small duty cycle. The duty cycle can then be increased gradually to gradually equalize the current distribution in the radial direction. Other mechanisms can be employed to control the relative amounts of current provided by the main asymmetric anode and the one or more other anode segments.

In embodiments where copper above the damascene field (overburden) or other material is being removed from a work piece, the conductive layer remaining on the work piece surface becomes gradually thinner during processing. As with the case of a thin seed layer, this gives rise to an increasingly strong terminal effect. In the material removal case, however, the terminal effect becomes more pronounced later, rather than early, in the process. Thus, over time, less current is provided to the center region of the work piece and relatively less material is removed from there if an appropriate correction is not provided. To address this situation, the asymmetry of the current delivered from the asymmetric electrode assembly (a collection of cathodes in this case) may need to become more pronounced as the process proceeds. If an azimuthally asymmetric cathode and one or more additional cathode elements are employed, the process may begin with the current delivered to the cathode element(s) as well as the main asymmetric cathode. As the conductive layer on the work piece becomes gradually thinner during processing, the cathode element(s) can be shut off to thereby compensate for the terminal effect.

In cases where the intent is to address the terminal effect, the asymmetry in the electrode should be designed to concentrate current toward the center of the work piece. Such electrode may take a "heart" shape, for example. If the intent is to direct current toward the edge of the work piece, the asymmetric electrode may take a "vase" shape, for example. It should also be understood that in some cases it will be desirable to force more current toward the edges of the work piece, rather than concentrating the current toward the center of the work piece. This may be appropriate if the work piece surface is initially radially non-uniform or subsequent process requirement dictate such a non-uniform (e.g. edge thin) thickness distribution.

In accordance with this invention, a method of electrochemically processing a metal layer on a work piece may be characterized by the following operations: (a) providing an azimuthally asymmetric electrode in a reactor; (b) providing the work piece in the reactor at a position substantially aligned with the azimuthally asymmetric electrode; (c) rotating at least one of the work piece and the azimuthally asymmetric electrode with respect to the other; and (d) electrochemically processing the metal layer on the work piece while rotating to thereby provide a radially varying source of current over the period of rotation. Typically, the work piece will contact an electrolyte during such processing. Generally, the asymmetric electrode will have an azimuthally varying radius, which may vary gradually or abruptly in the in the azimuthal direction. In some applications, the work piece is a semiconductor wafer.

As indicated, an asymmetric electrode may have various shapes as appropriate for the application at hand. In certain embodiments, the electrode occupies a radially varying angular arc that is generally greater in a center region of the electrode than in an edge region of the electrode, as determined with respect to a region circumscribed by rotation about a center of rotation on the electrode. In certain embodiments, the reverse is true: the electrode occupies an angular arc that is generally greater in an edge region of the electrode than in a center region of the electrode, as determined with respect to a region circumscribed by rotation about a center of rotation on the electrode. Note that the center of rotation is defined with respect a point on the electrode. The edge and center regions are defined based on that center of rotation, regardless of whether the work piece is rotating, the electrode is rotating or both are rotating. In the latter case, certain embodiments employ an orbital motion, in which the electrode and work piece centers of rotation are offset from one another or one or both revolves about an axis offset from a corresponding center of rotation. Many different orbiting arrangements of work piece and processing pad are employed in the chemical mechanical polishing art and all of these are within the purview of this invention.

In certain embodiments, rotating the work piece and/or the azimuthally asymmetric electrode provides a radially varying time-averaged current distribution in which a relative amount of current at or near a center of rotation for the electrode is greater than in the electrode periphery. In certain embodiments, the reverse is true: the radially varying current distribution provides a relative amount of current at or near a center of rotation for the electrode that is lesser than in the electrode periphery In certain embodiments, operation (d) from the above method (electrochemically processing the metal layer) comprises passing a current between the metal layer and the azimuthally asymmetric electrode whereby the current is distributed such that, over a period of rotation, the metal is deposited or removed substantially uniformly onto the entire surface area of the metal layer. In certain embodiments, the current is distributed such that, over a period of rotation, the metal is deposited or removed according to a non-uniform pattern on the metal layer.

In certain embodiments, the method employs one or more electrode segments (which themselves can be azimuthally asymmetric), each isolated from each other and from the azimuthally asymmetric electrode so that they can deliver current independently of one another. Activation of such electrode segments can be staggered in time with respect to the azimuthally asymmetric electrode. This may allow the current distribution at the work piece to become radially more uniform or non-uniform over time. Certain embodiments comprise delivering current from an electrode segment only after the processing in (d) has taken place for a period of time. Certain embodiments comprise removing current from an electrode segment after the processing in (d) has taken place for a period of time. In certain embodiments, delivering current from the electrode segment comprises delivering pulses of current from the electrode segment. The duty cycle of the current pulses may increase over time such that a percentage of the total current attributable to the electrode segment increases over time. Alternatively, the duty cycle of the current pulses may decrease over time such that a percentage of the total current attributable to the electrode segment decreases over time. In another approach, the total current from the various elements can be modulated in time (increased or decreased) with respect to one another.

Certain embodiments comprise distributing the current between the azimuthally asymmetric electrode and at least one other electrode segment to reduce, over time, non-uniformity in current delivered to the work piece. Certain embodiments comprise distributing the current between the azimuthally asymmetric electrode and at least one other electrode segment to increase, over time, non-uniformity in current delivered to the work piece.

Also disclosed herein are apparatus for electrochemically processing a metal layer on a work piece. In one embodiment the apparatus is characterized by the following features: (a) a reactor chamber; (b) an azimuthally asymmetric electrode in the reactor chamber; (c) a work piece holder for holding the work piece in the reactor at a position substantially in alignment with the azimuthally asymmetric electrode; and (d) a mechanism for rotating at least one of the work piece and the azimuthally asymmetric electrode with respect to the other. When the work piece and the asymmetric electrode are in alignment, they may, but need not, have their respective centers of rotation coincide. In certain embodiments, the work piece holder is designed to position the work piece in an electrolyte bath. The structure azimuthally asymmetric electrode may have a shape and structure as described above.

As indicated in connection with the method described above, the apparatus may include one or more electrode segments, each isolated from each other and from the azimuthally asymmetric electrode so that they can deliver or receive current originating from the work piece independently of one another. To facilitate use of these separate sources or sinks of current, the apparatus may include a control circuit for independently adjusting the current delivered from the azimuthally asymmetric electrode and each of the one or more electrode segments. That control circuit can be designed or configured to deliver current from an electrode segment only after first delivering current from the azimuthally asymmetric electrode for a period of time or turn off current the electrode segment only after delivering current for a period of time to both the electrode segment and the azimuthally asymmetric electrode. It can also be designed or configured to deliver current pulses from the electrode segment, and optionally adjust a duty cycle of the current pulses over time such that a percentage of the total current attributable to the electrode segment increases over time.

In some embodiments, the apparatus also includes an insulating focusing wall around the azimuthally asymmetric electrode to focus current from the asymmetric electrode during electroplating or electrolytic material removal. When additional electrode segments are employed, the apparatus may include additional insulating focusing walls around the electrode segments to focus current from the electrode segment in the electrolyte.

Yet another aspect of the invention pertains to methods of electrochemically processing a work piece having a region that requires more or less processing than at least one other area on the work piece. Such methods may be characterized by the following sequence: (a) providing an electrode assembly in a reactor, the electrode assembly comprising multiple separate electrode segments having distinct radial and/or azimuthal positions; (b) providing the work piece in the reactor at a position substantially aligned with the electrode assembly; (c) rotating at least one of the work piece and the electrode assembly with respect to the other; and (d) during rotation, adjusting the current and/or voltage provided to individual electrode segments in the assembly in a manner that tracks the region on the work piece requiring more or less processing than at least one other area on the work piece. In certain embodiments, at least one of the electrode segments is azimuthally asymmetric. In other embodiments, no electrode segment is azimuthally asymmetric. As in the other aspects of the invention described above, the electrochemical processing may comprise electroplating and/or electrolytic removal of material.

These and other features and advantages of the present invention will be described in more detail below with reference to the associated drawings.

BRIEF DESCRIPTION OF THE DRAWINGS

FIG. 2B is a top down schematic of an asymmetric electrode design in accordance with another embodiment of this invention.

DETAILED DESCRIPTION

Introduction

Figure 1:
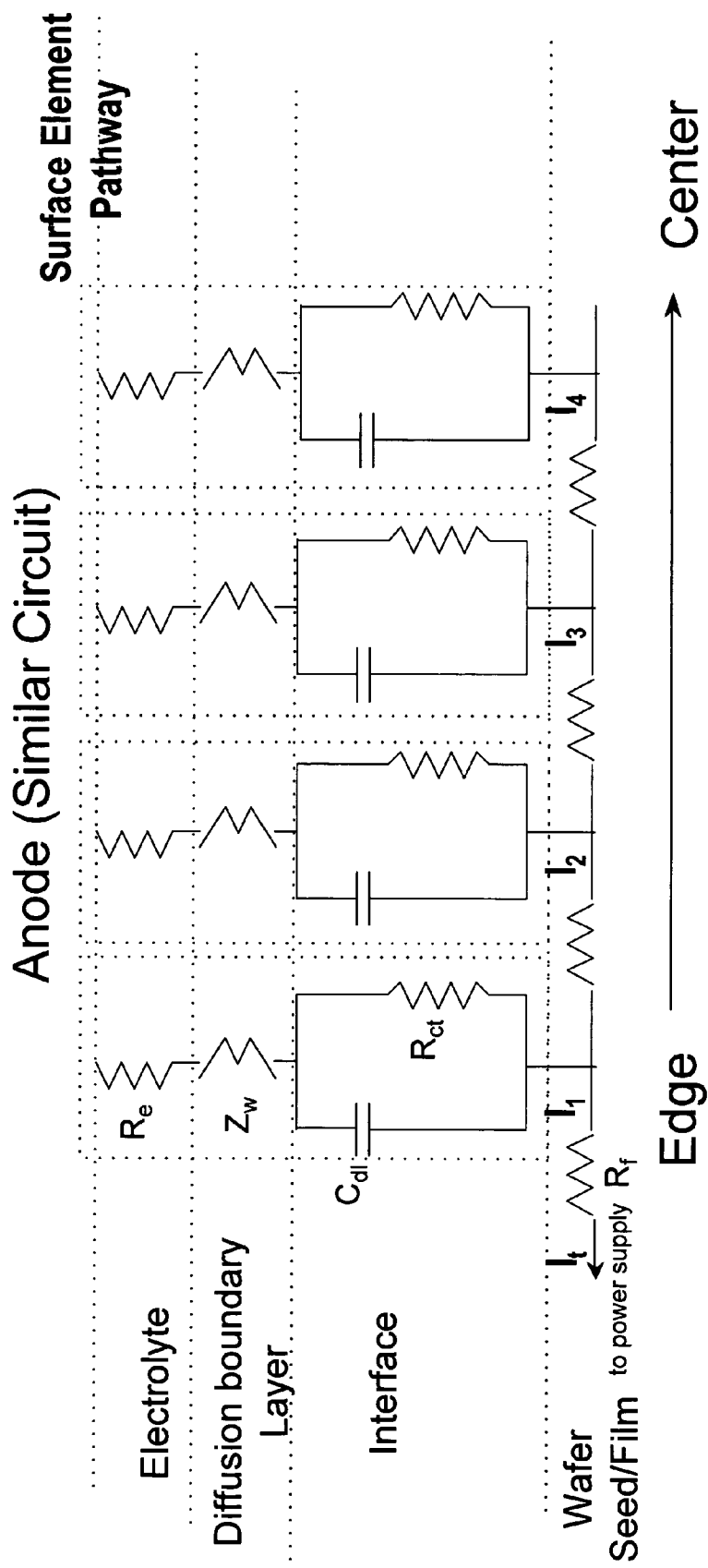
FIG. 1 is a schematic diagram depicting an equivalent circuit for electroplating on a thin seed layer.

In the following detailed description of the present invention, specific embodiments are set forth. However, as will be apparent to those skilled in the art, the present invention may be practiced without these specific details or by using alternate elements or processes. For example, the invention is described in terms of electroplating on wafers, particularly semiconductor wafers undergoing damascene processing. However, the work piece is not limited to such wafers. The work piece may be of various shapes, sizes, and materials. In addition to semiconductor wafers, other work pieces that may take advantage of this invention include various articles such as printed circuit boards, flat panel displays, and the like. Further, as explained, the invention is not limited to electroplating but also applies electrolytic removal of metal or material from a work piece.

As mentioned, aspects of the invention pertain to methods and apparatus for electroplating a layer of a metal onto a work piece having a seed layer thereon. The ionic current of a plating cell is provided using an azimuthally asymmetric anode where the anode and the work piece are aligned and at least one of them rotates in order to tailor the current distribution in the plating electrolyte to compensate for resistance and voltage variation across a work piece due to the seed layer. Stated another way, the asymmetric anode sources of this invention correct for radial plating-rate non-uniformities by exposing a rotating substrate (wafer) to an anode whose shape yields less anode exposure at larger radii over a given rotation, and compensates for the natural higher plating rate while the wafer is exposed to the anode. As the film grows and the resistance gets smaller, radial current density differences decrease, requiring a longer exposure to an anode/virtual-anode at larger radii than earlier in the process. Additional asymmetric electrodes are then added to the overall anode circuit (by individually energizing them), thereby increasing the anode exposure time as the process proceeds. In some embodiments, vertical insulating walls around the individual anodes serve as focusing elements to create "virtual anodes" in proximity to the plating surface of the work piece to further control the current distribution in the electrolyte during plating. Any embodiments herein that refer to an "anode" may be understood to include a cathode, or "virtual" anode or "virtual" cathode (depending on the particular application).

This invention is described in relation to electroplating methods and apparatus for use in integrated circuit (IC) fabrication. In this respect, the invention provides a simple, low cost, reliable method for the production of uniform electroplated films on very thin metal seeded wafers for integrated circuit fabrication, yielding improvements over the capabilities of current technology. This invention provides excellent uniformity control and improved electrofilling quality of wafers having thinner seed layers, larger diameters (e.g., 300 mm), higher feature densities, and smaller feature sizes.

The invention also relates to particular plating, plating planarization (e.g. planar plating where plating is accompanied with work piece rubbing or polishing), electropolishing (including classical or electrochemical mechanical polishing), or other etching or planarization tools and processes in which electrical contact is made in the edge region of the wafer substrate. The invention is not limited to any general type of apparatus. One suitable example is the SABRE™ clamshell electroplating apparatus available from Novellus Systems, Inc. of San Jose, Calif. and described in U.S. Pat. Nos. 6,156,167, 6,159,354, 6,193,859, and 6,139,712, and in U.S. patent application Ser. No. 10/010,954, filed Nov. 30, 2001, titled "Improved Clamshell Apparatus with Dynamic Uniformity Control," which is herein incorporated by reference in its entirety. Another example is a microcell configuration as described in US Patent Publication No. 2004/0065540 (Mayer et al.), which was previously incorporated by reference.

Various terms of art are used in this description of this invention. These terms should be construed broadly. Some relevant considerations follow.

Wafer—Frequently, a semiconductor wafer is the work piece to be plated. The invention is not so limited. In this document, the term "wafer" will be used interchangeably with "wafer substrate", and "substrate." One skilled in the art would understand that these terms could refer to a semiconductor (e.g. silicon) wafer during any of many stages of integrated circuit fabrication thereon.

Wafer Holder—A wafer holder is a component that immobilizes a wafer and has or is associated with positioning components for moving the wafer, e.g. rotation, immersion, and that has or is associated with circuitry for applying an electrical potential to the wafer via a conductive layer thereon. An exemplary wafer holder is provided with the Clamshell apparatus available from Novellus Systems, Inc. of San Jose, Calif. A detailed description of the clamshell wafer holder is provided in U.S. Pat. Nos. 6,156,167, 6,159,354, 6,193,859, and 6,139,712, each of which is incorporated herein by reference for all purposes. In a microcell reactor, a mechanical or vacuum chuck may be employed to hold the wafer. This is described in the above-referenced US Patent Publication No. 2004/0065540.

Seed Layer—A seed layer generally refers to a thin conductive layer on a work piece through which current is passed to effect, for example, electroplating. Frequently, seed layers employed with this invention will be copper layers on wafers, however, the invention is not so limited. Layers of other materials such as ruthenium and some conductive barrier materials may be employed as well. The seed layer may also comprise of a series of metals over one another. The seed layer thickness is generally a function of the technology node being implemented. In many situations, the seed layer will have a thickness of between about 30 and 1000 Angstroms.

Focusing Element—A focusing element is a structure that focuses, contains, segregates, channels, or otherwise directs the current density in an electrolyte arising from a particular electrode's interaction with a counter electrode. For example, focusing walls are insulating walls that focus, contain, segregate, channel, or otherwise directs the current in a region of an electrolyte within the element between one electrode, contained within the element, and a counter electrode (e.g. a seed layer on a work piece). If a plurality of closed focusing walls are used in conjunction with distinct electrode structures, then each closed wall focuses, contains, segregates, and otherwise directs the current density in a region of the electrolyte within it and between an electrode, also contained within it, and the counter electrode.

Virtual Electrode—A virtual electrode refers to the aperture of a focusing element, e.g. a closed focusing wall, through which current from an actual electrode passes before reaching a counter electrode. For a closed focusing wall, the virtual electrode work surface area is defined by the inner walls of the topmost portion (an open end) of such wall through which current passes before reaching the counter electrode. If an asymmetric electrode has a corresponding asymmetrically shaped focusing element, then its corresponding virtual electrode has a similar asymmetric-shaped structure. In this application the area spanned by the virtual electrode is termed the "work surface area" of the virtual electrode. When a focusing element is used with an electrode, the current in the electrolyte induced between the anode and a cathode of a cell must pass through the work surface area (i.e. an aperture) of the corresponding virtual electrode produced by the focusing element. Generally, virtual electrodes of the invention are of fixed area, that is, the focusing element apertures are not dynamically controlled (e.g. an iris). However, such apparatus are not outside of the scope of the invention. Detailed descriptions of focusing elements used in conjunction with shielding elements are provided in U.S. Pat. No. 6,755,954, having Steven T. Mayer et al. as inventors, issued Jun. 29, 2004, and titled "Electrochemical Treatment of Integrated Circuit Substrates Using Concentric Anodes and Variable Field Shaping Elements," and U.S. Pat. No. 6,402,923, having Mayer et al. as inventors, issued Jun. 11, 2002, which are incorporated herein by reference for all purposes. It should also be noted that the actual electrode of a virtual electrode need not have the same shape as the virtual aperture. For example, the aperature may be azimuthally asymmetric, while the associated electrode is of a different shape, e.g., azimuthally symmetric or circular.

Time of exposure correction to the current distribution—This refers to a current distribution correction technique in which certain regions of the work piece are exposed to current from a counter electrode for less time than other regions of the work piece. For example, regions of a work piece near the terminal may be directly exposed to current from an anode source for less time than are regions far removed from the terminal. In a typical wafer-plating scenario described above, the terminal is located at the perimeter of wafer. In such scenario, the time of exposure correction is applied so that the edge regions of the wafer are directly exposed to the anode current for only a fraction of the time that the central regions of the wafer are so exposed. The time of plating can be controlled in various ways. In this invention, it is accomplished by periodically aligning different regions of the work piece over one or more electrodes during plating. This may be conveniently implemented by rotating the wafer above an asymmetric electrode as described herein.

As indicated, embodiments of the invention pertain to plating, planarization while plating, electroetching, and polishing. Examples of material removal processes that may be employed with this invention include electrochemical mechanical polishing (ECMP), including applications employing pads comprising holes, fibers, etc., membrane-mediated electropolishing (see Published PCT Application WO 205/042810 filed Nov. 1, 2004 and incorporated herein by reference), electropolishing (see, e.g., U.S. Pat. Nos. 6,315,883 issued Nov. 13, 2001, 6,709,565 issued Mar. 23, 2004, and 6,653,226 issued Nov. 25, 2003, each incorporated herein by reference), including electropolishing with diffusion barriers, concurrent deposition and planarization techniques (see, e.g., U.S. Pat. Nos. 6,802,955 issued Oct. 12, 2004, 6,736,952 issued May 18, 2004, and 6,572,755 issued Jun. 3, 2003, each incorporated herein by reference), and related processes. In the case of material removal, the asymmetric electrode will normally be a cathode. If a pad or membrane is employed, these may be provided over an asymmetric cathode or cathode assembly as described below. In certain embodiments, the cathode assembly will include insulating walls to provide a virtual cathode or cathodes.

In plating environments, planar plating techniques may be employed in some embodiments employing asymmetric electrodes of this invention. Such techniques may involve (1) creating an activating film over the entire surface (by spraying, dipping, electrochemical reduction, or any other means of formation), followed by (2) selectively removing or modifying the deposited activating film in exposed regions to modify the films activation, and finally (3) electroplating metal preferentially into the recessed regions using a bath containing limited amounts of the material used to form the activating film. The activating film may be a plating accelerator for example. See, e.g., U.S. patent application Ser. No. 10/739,822, filed Dec. 17, 2003, which is incorporated herein by reference for all purposes.

Azimuthally Asymmetric Electrode and Assembly of Electrodes

Figure 2A:
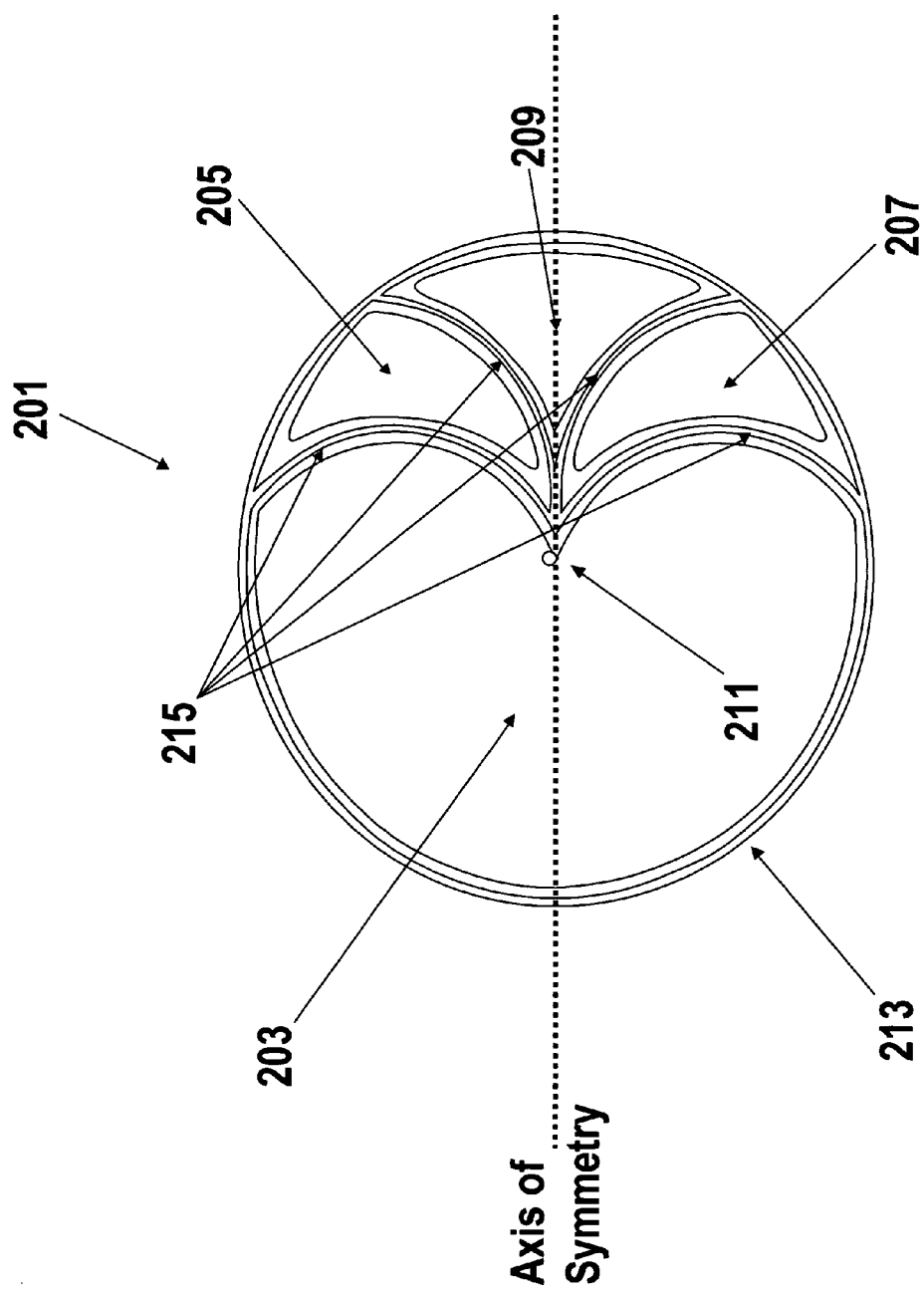
FIG. 2A is a top down schematic of an asymmetric electrode design in accordance with an embodiment of this invention.

A top down schematic of an exemplary asymmetric anode design is shown in FIG. 2A. Note that the depicted assembly could just as well be applied to a cathode design for use in electroplanarization or other material removal applications. In the design shown, an anode assembly 201 includes a primary azimuthally asymmetric anode 203 and multiple secondary anode segments 205, 207, and 209. The work piece, which is not shown, lies above anode assembly 201 and rotates about an axis substantially aligned with a center axis 211 of the anode assembly. In a typical embodiment, the footprint of the work piece corresponds (at least roughly) to the perimeter of anode assembly 201. However, this need not be the case and frequently in designs employing orbital motion (where both the work piece and asymmetric electrode(s) rotate and/or revolve and do so about offset axes), the footprints are significantly different.

Generally, an orbital arrangement employs offset rotations and/or revolutions by the work piece and asymmetric electrode assembly. Many different orbiting relative movements of the work piece and active elements (e.g., pads) are employed in the chemical mechanical polishing art. All such arrangements may be employed in the contest of this invention. In certain embodiments, the orbiting movement will have a characteristic time or period between unique relative arrangements of work piece and asymmetric electrode. Such arrangements repeat periodically at the characteristic time.

Initially, to provide a large fraction of the ionic current to the central region of the work piece (proximate the rotational axis), only asymmetric anode 203 is energized and provides current. The regions of assembly 201 occupied by segments 205, 207, and 209 do not provide any significant current during this initial phase of the plating process when the terminal effect is most severe. Thus, at any given instant in time, a relatively large section of the work piece periphery is not located over top of anode 203 (or otherwise aligned with any portion of anode 203). Of course, as the work piece rotates, any given point on its periphery comes over the region of anode 203 and then passes beyond it. Because a relatively large segment of the work piece periphery is out of "contact" with anode 203 at any instant in time, while much more of the central regions remains in contact, the driving force for plating from anode 203 is non-uniformly distributed over the radius of the work piece. This compensates for the terminal effect described above. As the plated layer grows, and the terminal effect decreases, the other anode segments can be turned on gradually. Again, the same geometric principles can be applied to a cathode employed in electropolishing or electroplanarization. However, the need for compensation will be most pronounced late in the process when most metal has been removed and only a thin layer remains. Hence, the process may begin with all cathode segments being turned on at the same current (providing ionic current) and over time some or all of them are turned off or have their current reduced until only the principal asymmetric cathode remains on at the end of the process. Note that the current and/or potential to individual electrodes and electrode segments can be controlled independently. This may be done to provide fine control over the degree of radial non-uniformity in ionic current from the electrodes as appropriate. For example, to gradually adjust the radially non-uniformity during processing, electrode segments can be energized or de-energized gradually to thereby minimize abrupt changes in current distribution when electrode segments turn on or off.

The asymmetric anode 203 is shaped to yield a particular time-of-exposure correction to the current distribution. As shown in the example of FIG. 2A, a portion of anode 203 is generally circular, having a constant radius from center point 211. This is the left side of the anode as shown in FIG. 2A. In the depicted example, the region of constant radius occupies nearly 180 degrees of the overall anode assembly. Beyond this region, the radius gradually decreases toward an angular position where the radius becomes zero. That is, there are no abrupt changes in radial value as one moves azimuthally. In the example at hand, this produces the heart shaped structure shown in FIG. 2A. With this design, the outer radius of the work piece will lie over top of the anode during only one-half the period of rotation. More centrally located regions of the work piece will lie over top of the anode for progressively longer periods of time.

Many possible shapes will provide the benefits of this invention. Generally, the electrode will be azimuthally asymmetric. In other words, the electrode varies in some manner at different azimuthal positions. This is manifest as a structure having different amounts of electrode material at different azimuthal positions. Typically, the electrode radius varies azimuthally, with some azimuthal fraction of the anode having a constant or nearly constant radius. Over the remaining azimuthal fraction the radius varies, typically in a gradual manner. Of course, many other azimuthally asymmetric shapes can be employed. For example one azimuthal portion of the electrode can have a radius co-extensive with that of the work piece and another azimuthal portion can have a smaller radius. An abruptly or gradually varying radius can separate the two azimuthal portions. Other shapes will be readily apparent to those of skill in the art. In certain embodiments, the angular arc occupied by the electrode will be greater in the more central regions (determined with reference to the aligned work piece) than the terminal edge regions. By controlling the electrode shape, one can easily attain a ratio of 2 or more in current directed at the center of the work piece with respect to current directed at the periphery of the work piece (or vice versa).

FIG. 2B presents another example of an asymmetric electrode geometry. This example directs current toward the periphery of the work piece, with relatively less current being directed toward the center of the work piece. In this example, an electrode assembly 251 includes a primary azimuthally asymmetric electrode 253 (roughly vase shaped) and three secondary electrode segments 255, 257, and 259. At least one of the electrode assembly and the work piece rotates with respect to the other during electrochemical processing. In certain embodiments, the footprint of the work piece corresponds (at least roughly) to the perimeter of electrode assembly 251.

One way to estimate a useful asymmetric shape is to first determine (via mathematical simulation or experimentation) the current distribution I(r) that would result from processing a substrate in the same electrolyte bath and all other tool design consideration at the same target nominal plating or material removal rate and an electrode of a complete disk shape (i.e., no partitioning). A time-of exposure correction function F(r) is obtained as the ratio of the current at the work piece center I(0) to the current at the particular radius I(r).

$$F(r) = \frac{I(0)}{I(r)} \quad (3)$$

The radial coordinate angle of the electrode edge/insulator wall is then readily determined as follows.

$$\Theta = 2\pi(1 - F(r)) \quad (4)$$

Figure 3:
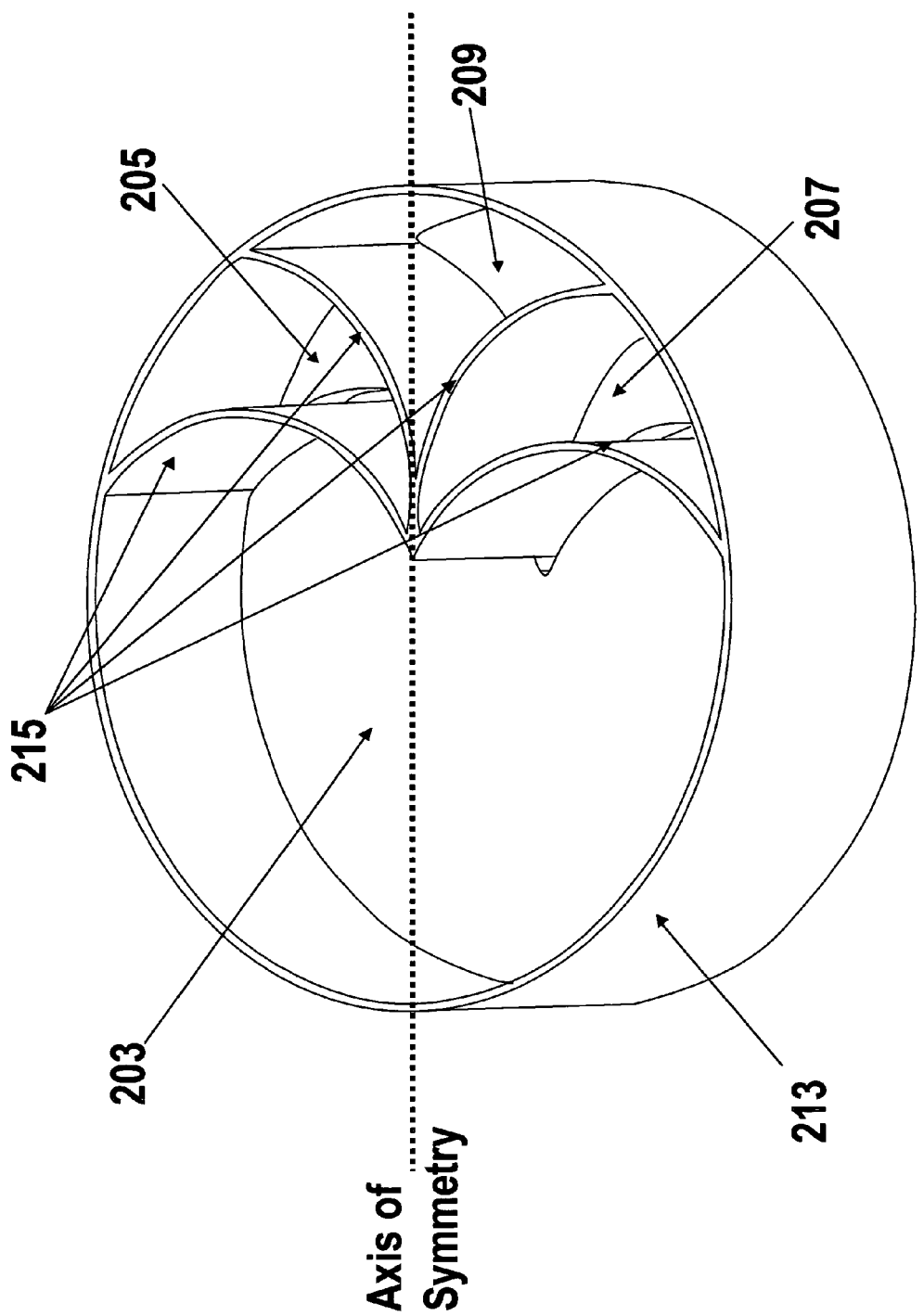
FIG. 3 is a diagram of the anode design of FIG. 2A and having vertically extending focusing elements to create virtual electrodes in accordance with an embodiment of this invention.

As shown in FIG. 2A, the electrode assembly is contained within a vertically extending electrode chamber wall 213. In addition, the individual electrode segments (including asymmetric electrode 203) are isolated from one another by vertically extending electrode isolator walls 215. FIG. 3 shows this structure more clearly in perspective view. This structure serves to produce closed isolator walls around the individual electrode segments of assembly 201. Each electrode segment may be electrically isolated from one another and the ionic current produced there from is confined within the closed isolator wall until reaching the top of the wall. This allows the actual anode to be significantly removed from the substrate, creating a "virtual electrode" (which is much closer to the substrate) and isolating the individual electrode and limiting their interactions.

The creation of a virtual electrode, as used herein, is significant. The combination of the electrode lying within and at the base of its individual asymmetric electrode chambers (as defined by the electrode chamber outer wall 213 and the individual interior asymmetric electrode walls 215) creates a "virtual" asymmetric electrode. Such an electrode construct is mathematically similar to the situation of having an electrode of the same shape at the opening of the asymmetric electrode chamber. Therefore, one can obtain the benefits of having an electrode at that location while having the electrode physically located at other locations.

As indicated, initially in a plating process the terminal effect is most severe. At this stage, it is desirable to have all current provided by the principal asymmetric anode 203. But later in the process, as the terminal effect dissipates, the center plating rate will tend to increase. Allowed to continue unabated, this would lead to a non-uniform film in which the center is over-plated. To compensate for this effect, the invention may use multiple asymmetric electrodes (such as those shown in FIGS. 2A/B and 3), each acting as a separate (in some cases virtual) anode source. At the appropriate time(s), additional asymmetric anodes are made "active" by connecting them to the anode lead of the power supply (for example, via a relay). These added electrodes increase the average time-of-exposure of edge substrate regions versus their earlier, more restricted exposure, thereby increasing the time-integrated average current at the edge and compensating for this effect. As shown in the FIGS. 2A/B and 3, the added electrodes may have a generally triangular shape with curved edges. Of course, many other shapes can be employed.

Figure 4:
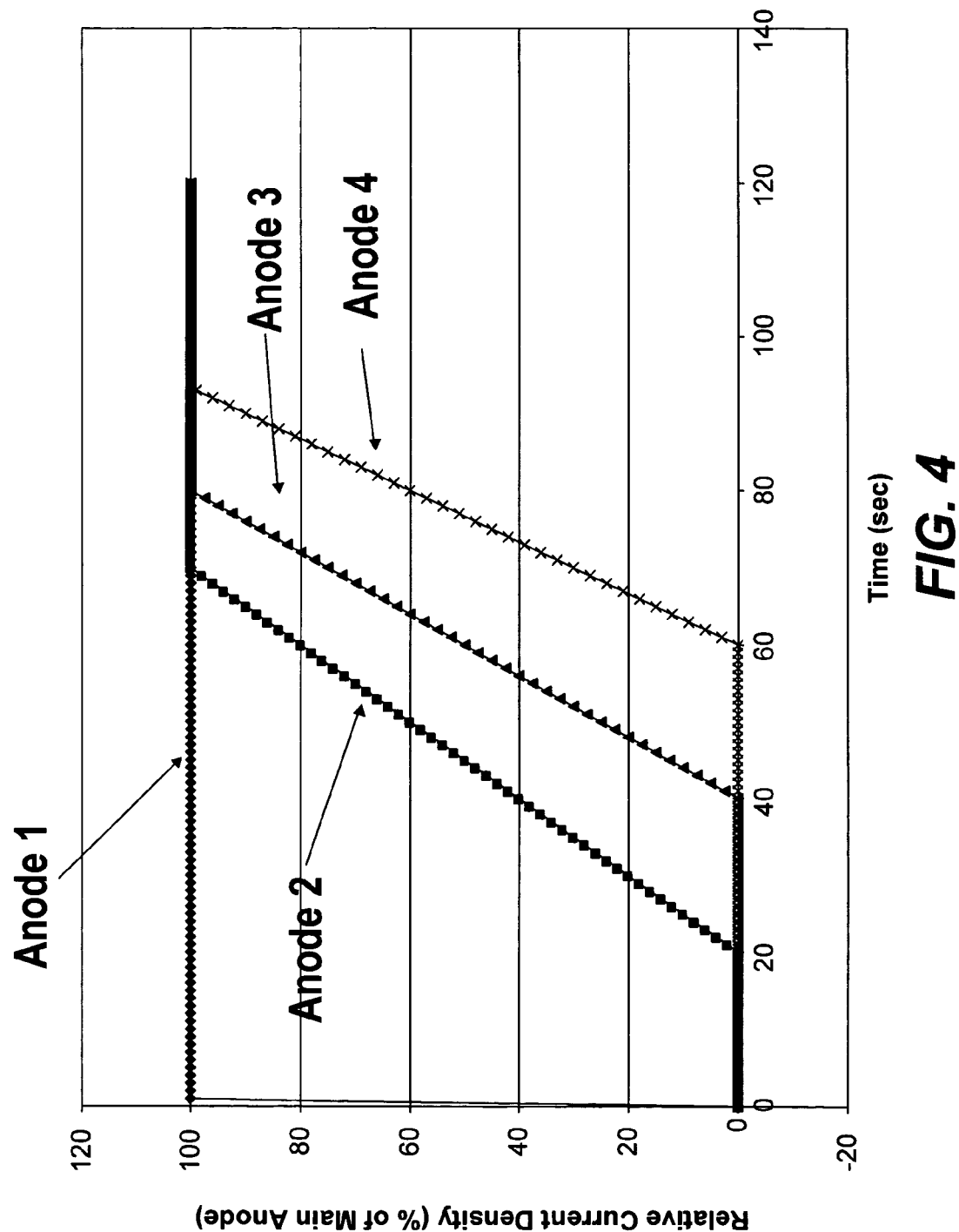
FIG. 4 is a graph showing the current level versus time sequence provided by individual asymmetric electrodes in an electrode assembly according an embodiment of this invention.

A significant degree of process flexibility and control can be achieved by using a lower current or a periodic activation (e.g., pulsing) of the secondary asymmetric electrodes, as the need for more edge current at the edge region is required (specifically in the case of plating where the film thickness increases as the process progresses). This is depicted graphically in FIG. 4. As an example, rather than having one or more of the secondary asymmetric electrodes be energized at the same current as the first anode (primary anode 1 shown in FIG. 4), the current can be gradually increased in time, thereby slowly transitioning from a state or no current over a finite arc length of rotation, to a smaller and smaller difference over the total rotation. As shown in FIG. 4, the current anode 2 gradually ramps up to full value (the same magnitude as anode 1) over a period of approximately 40 seconds. Then later in the plating process, anode 3 is gradually activated over a period of approximately 30 seconds. Finally the last anode, anode 4, is gradually activated again over a period of approximately 30 seconds. Successive and gradual activation in this manner-provides a finely controlled change in the current distribution, moving toward a more uniform distribution.

Figure 5:
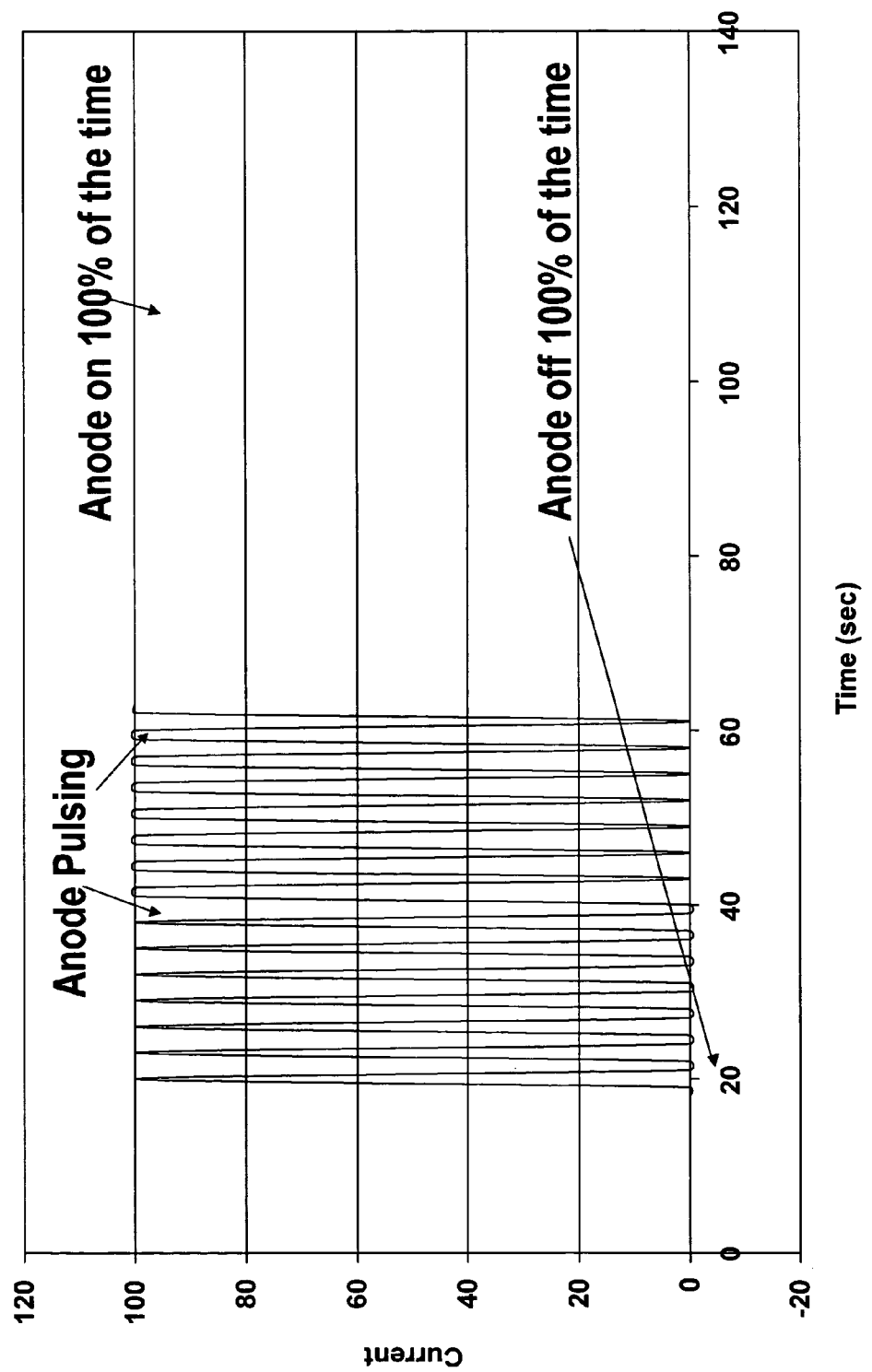
FIG. 5 is a graph showing an exemplary pulsing procedure in which a secondary asymmetric electrode gradually comes up to 100% activation.

In another example, rather than having one or more secondary asymmetric anodes become energized 100% of the time when activated, they can be energized for only a fraction of the total time. In other words, the anodes can pulsed so that they provide current for only a fraction of the time. The amplitude of the current pulses can be full height (e.g., at the level of the current delivered by the primary asymmetric anode) or limited to some fraction of the full height. In one embodiment, the duty cycle of the current pulsing can be increased over time to provide a gradual increase in the contribution of the secondary anode(s) to the total current delivered. A simple approach to varying the duty cycle is shown in FIG. 5.

In the case of pulsing, two methods of pulsing may be considered. One uses a relatively high pulsing rate with respect to the period of wafer rotation. The other uses a slower pulsing rate in which on-off periods are cycled to coincide with the rotation period and modulate an integral number of rotation cycles that the current is on and is off. Gradually, the ratio of the number of on cycles with respect to the number of off cycles can be increased until that particular anode is finally on 100% of the time. Other anode segments (for example, anodes, 207 and 209 in FIGS. 2A and 3) can be sequenced to follow a similar process trend, only later in the overall process. This allows for a gradual transition between the fully off and fully on states for any given asymmetric anode. Note that if one desires to maintain azimuthal uniformity of the process using relatively long pulsing time (0.25 sec to 10 seconds, corresponding to a wafer rotation rate of from 240 down to 6 rpm), the on-to-off times generally should be an integral value, with the fundamental base period equal to an integral of the rotation period. FIG. 5 shows an example of duty cycles and currents for one of these schemes.

Note that the above examples pertain to plating. If instead the processing is planarization or other material removal process, then the situation with respect to energizing electrode segments may be reversed. For example, in contrast to the situation depicted in FIG. 4, the electrode segments may be initially energized and then gradually shut off. Further, the situation with respect to FIG. 5 may involve pulsing with a duty cycle that is initially high and then lowered.

In certain circumstances (particularly with very thin seed layer films) the initial relative difference in edge-to-center current can be quite large and may not be adequately compensated for using the asymmetric anode method alone. For example, when plating a wafer and filling recessed features for damascene circuit manufacturing, there is a limited current density range (a current density "operating window") over which successful void-free feature filling and defect free plating will be obtained. If the intrinsic non-uniformity without using an asymmetric anode is too great, the asymmetric anode may be combined with other techniques (e.g., variable shielding, concentric anodes, or a membrane located close to the wafer) to bring the non-uniformity within an asymmetric anode correctable range.

Note that while many applications of the invention involve depositing or removing a substantially uniform layer of material, other applications have different objectives. For example, if the wafer or other work piece to be processed has a concave or convex surface (locally or globally), it may be desired to employ an asymmetric electrode of this invention to non-uniformly deposit or remove material and thereby correct the initial non-uniformity in the work piece.

Method

Figure 6:
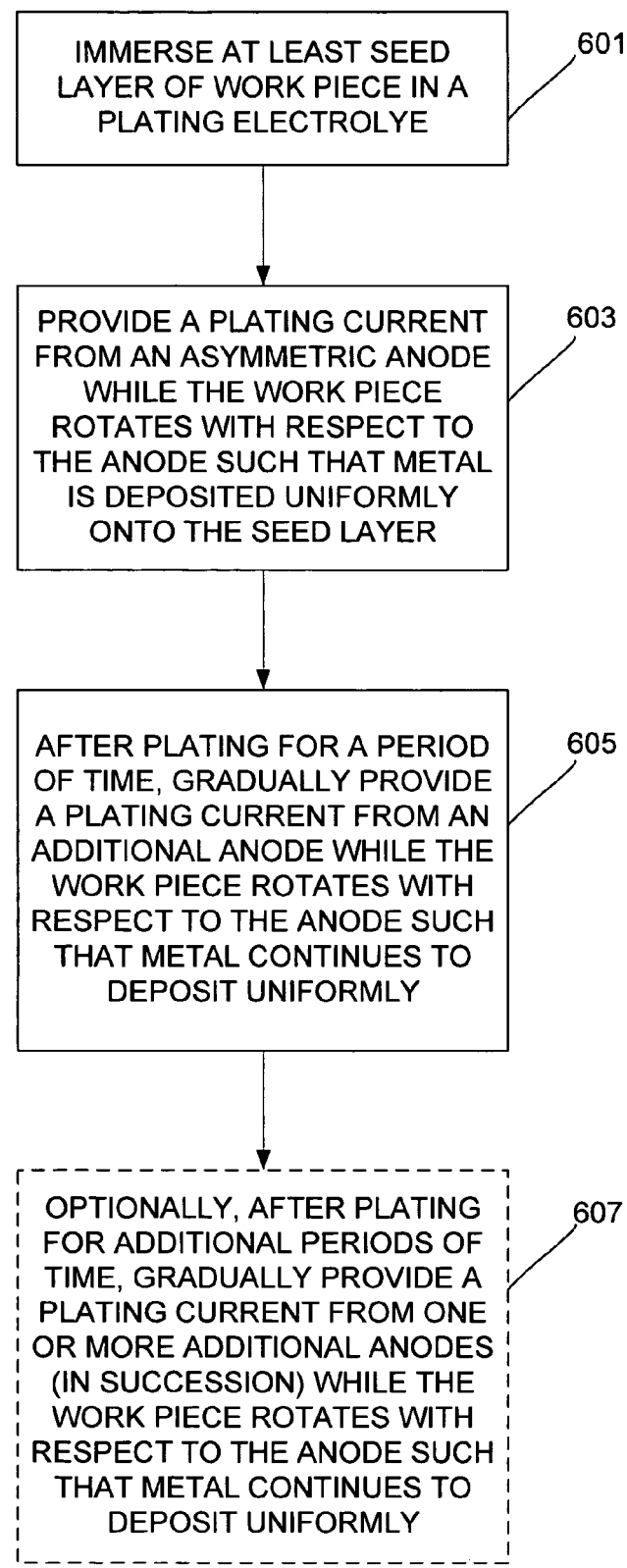
FIG. 6 is a flowchart depicting aspects of a method in accordance with the invention.

FIG. 6 shows an exemplary method, 600, for electroplating a substantially uniform layer of a metal onto a work piece having a seed layer thereon. Initially, at least that portion of the work piece having the seed layer thereon is contacted with an electrolyte containing ions of the metal. See 601. The electrolyte is provided in a plating cell containing an asymmetric anode assembly of this invention. Upon entry of the seed layer into the plating solution, or shortly thereafter, a plating current is provided from the primary asymmetric anode (e.g., anode 203 in FIGS. 2A and 3). See 603. The work piece and/or the asymmetric anode are rotated such that the peripheral regions of the work piece are directly aligned with the anode for only limited times during each rotation. In this manner, current from the anode is distributed non-uniformly over the seed layer radius providing a time of exposure correction.

After plating has occurred for a period of time, the resistance of the metal layer on the work piece decreases and the terminal effect begins to diminish. To address this situation, the current from anode assembly is modified by gradually providing a plating current from a secondary asymmetric anode in the plating solution (e.g., anode 205 in FIGS. 2A and 3). See 605. The work piece continues to rotate during this phase of the process. The current from the secondary anode may gradually increased as depicted in FIG. 4 and/or pulsed with a varying duty cycle so that the contribution of the secondary electrode to the total current increases in a controlled manner.

After the current from the secondary electrode has been increased to its maximum point, it is possible that the current distribution from the anode assembly is sufficiently uniform to allow plating to continue to conclusion with the desired result (a radially uniform deposit of metal). This may result when, for example, there are only two anode segments in the anode assembly—a primary asymmetric anode and one secondary asymmetric anode that occupies all or most of the circular region not occupied by the primary anode. Even without an anode arrangement of this form, the degree of uniformity in current distribution may be sufficient for the plating in some applications.

Alternatively, it will be necessary to further increase the uniformity of the current from the anode assembly at some time after the secondary anode is energized at 605. To this end, an optional operation (or operations) is provided at 607. This involves energizing one or more additional anodes (typically in succession) from the anode assembly. This is accomplished while the work piece continues to rotate with respect to the anode assembly. Typically, the additional anodes energize gradually as described above, again to finely control the change in current distribution from the anode assembly.

Throughout the process, the metal is preferably continuously deposited onto the surface area of the seed layer exposed to the electrolyte during plating. After a uniform metal layer of desired thickness is plated onto the work piece, the method of FIG. 6 is completed. As mentioned, semiconductor wafers are exemplary work pieces for methods of the invention.

A similar process may be employed to handle electropolishing or other material removal applications. However, asymmetric cathodes are used in place of asymmetric anodes and the plating current is replaced with a polishing current. Further, to the extent that additional electrodes are employed, the process may begin by having the additional electrodes activated and later, after a certain amount of material has been removed, they are deactivated, to introduce a more non-uniform source of current from the cathode assembly.

As illustrated, this invention provides flexibility to address changing or special current distribution requirements. Initially, in the case of plating, compensating for the terminal effect when the seed layer is thin, the current is distributed disproportionately so that an inner area of the wafer receives a far larger fraction of the current in the electrolyte resulting from the potential applied to an anode (or anodes) proximate to the inner region.

As the plated layer thickens and the terminal effect lessens, the plating current is distributed between the multiple anodes to produce a more uniform distribution suitable for a current state of plating. In this way, the current density in the electrolyte is tailored to provide uniform plating onto the seed layer despite changes during plating and/or resistance irregularities encountered in the seed layer. If focusing elements are used, then the plating current is distributed between the anodes toward a distribution that corresponds substantially to the work surface areas of the virtual anodes. For example, the actual anodes of the invention may be irregular or have large surface areas (such as a porous anode) but focusing elements of the invention provide a way to create uniform virtual anodes from any shape actual anode.

Electrolytic Cell

The disclosed equipment and methods are not limited in use to a particular electrochemical tool design or electrolyte chemistry. The functional operation of the design is to compensate for an undesirable surface condition (electrical or geometric) on the work piece. In plating wafers, the design may compensate for preferred edge plating associated with electrical resistance and voltage drop across the wafer (particularly at the beginning of the plating process when the seed layer is most resistive) by limiting and modifying the amount of anode exposure during the substrates rotation.

Figure 7:
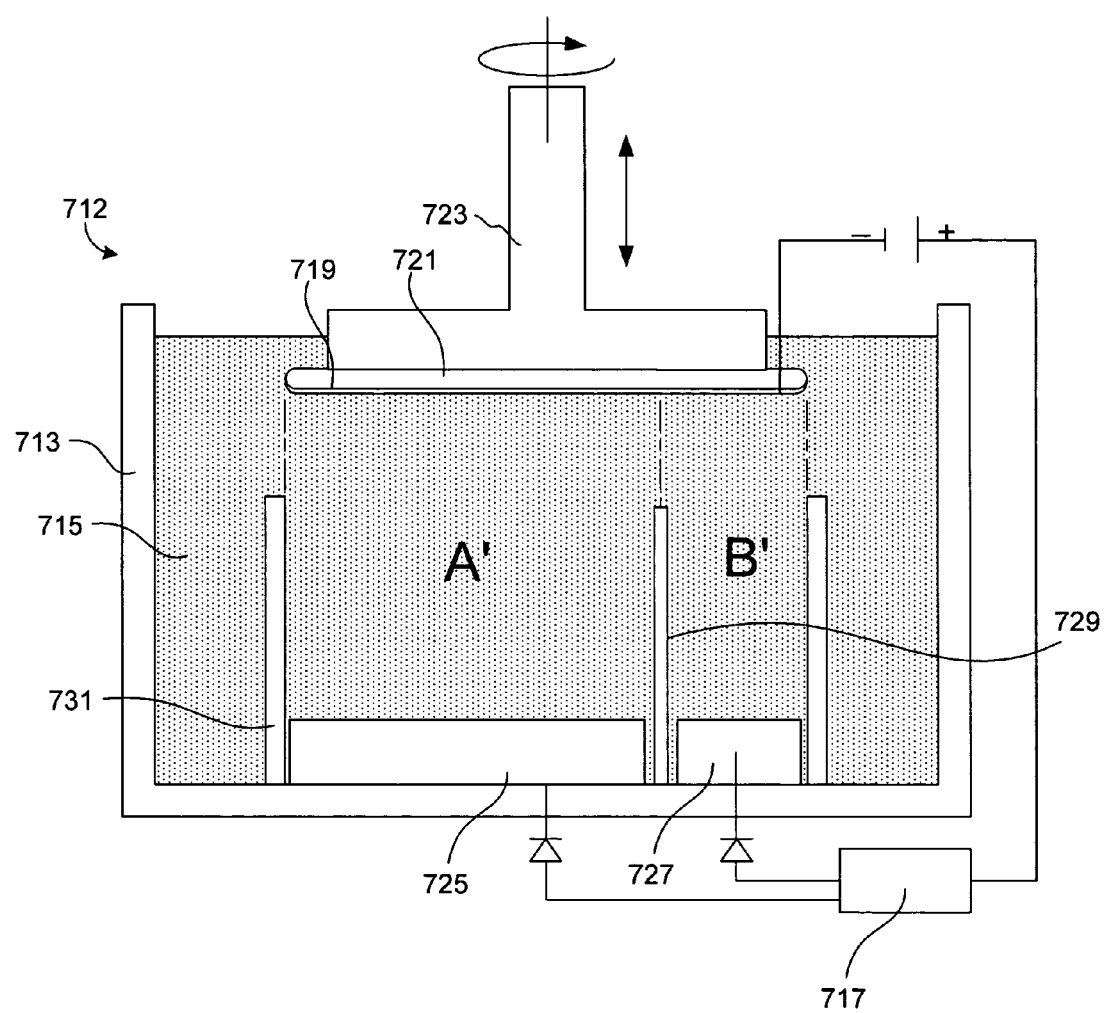
FIG. 7 is a cross-section depicting a plating cell suitable for this invention.

FIG. 7 is a simplified cross-section of a plating cell, 712, of the invention. Plating cell 712 has a vessel 713, for holding electrolyte 715 (preferably containing copper ions for plating copper onto a seed layer). A wafer holder 723 holds a wafer 721, which has a seed layer 719 thereon. In a typical damascene process, seed layer 719 is a copper seed layer. A circuit 717 distributes the plating current variably to each of two anodes, a primary asymmetric anode 725 and a secondary asymmetric anode 727. In one example, such a circuit employs diodes to ensure unidirectional current flow and lessen cross communication in the cell with respect to the anodes. In one embodiment, the work surface of the primary asymmetric anode has a surface area that corresponds to between about 60 and 95 percent of the platable surface area of the work piece to be plated. Preferably the work surface of the one or more secondary anodes has a surface area that corresponds to between about 5 and 40 percent of the platable surface area of the wafer to be plated.

In this example, anodes 725 and 727 are positioned in the bottom of vessel 713 such that there is sufficient space for vertical focusing element wall(s) 729 and an anode chamber wall 731. Focusing elements are effective in aiding methods of shaping current density in the electrolyte. The "virtual anodes" created by such focusing elements are "virtual" current sources, in this case at the element opening, which are mathematically and physically similar to the situation of having an actual anode located at the virtual anode locations. Therefore, one can obtain the benefits of having an anode at a particular location, without having to actually position the anode there.

Focusing elements of the invention preferably are made from, at least in part, an insulating material that is chemically compatible with the electrolyte. For example they can be made wholly of such material or be made of a non-insulative material that is coated with an insulative material. Suitable insulating materials for the focusing elements include at least one of plastic, nanoporous ceramic, and glass.

Anode chamber wall 729 defines a partially closed region for at least some of the focusing elements of anode segments in the anode assembly. A focusing element for the primary asymmetric anode 725 is used to focus current in electrolyte 715 arising from closure of the cell circuit between the cathode (seed layer 719) and primary asymmetric anode 725 (region A' in the electrolyte). Region A' is an asymmetric space spanning the distance between the work surface of anode 725 and seed layer 719 (see FIG. 3 for reference). Region B' is a similar asymmetric space associated with secondary anode 727.

Wafer holder 723 is capable of positioning wafer 721 in close proximity to the topmost portion of the focusing elements. Preferably the distance between the topmost portion of the focusing elements and the wafer is between about 0.5 and 20 millimeters during plating, more preferably about 2 to 5 millimeter. Preferably the walls of at least the anode chamber are between about 0.1 and 5 millimeters thick, more preferably between about 0.25 and 1 millimeters thick. Similar thickness ranges are appropriate for all the focusing element walls in the reactor.

Preferably the work surface areas of the virtual anodes of the invention are aligned to the work surface of the seed layer on which metal is deposited to thereby provide a relatively direct current path between the anode and the work piece. In practice this means that the rotational axes or center points of the anode and work piece should be substantially aligned and the planes defined by these electrodes should be substantially parallel. Further, the outer perimeters and areas of these electrodes (possibly as traced during a single rotation) should be substantially similar. FIG. 4 provides an example of such arrangement.

Plating cells of the invention can include a variety other features not shown in FIG. 7. The particular application and apparatus context will dictate the use of such other features. As examples, the apparatus may include flow flutes configured to distribute the electrolyte flow between the area encompassed by a focusing element for the primary asymmetric anode, and areas encompassed by focusing elements for one or more other asymmetric anodes. In some plating cells, diffuser membranes are used to create a uniform flow front in the electrolyte that impinges, for example, on the work surface of a wafer. In other embodiments, the apparatus includes a shielding element configured to shield a circumferential edge portion of the wafer from plating current during electroplating. Such shielding elements include, for example, a perforated ring shield proximate to the topmost portion of the anode chamber wall and/or a shielding element associated with the wafer holder.

For a number of practical reasons as described in U.S. patent application Ser. No. 10/609,518, filed Jun. 30, 2003 (Liquid Treatment Using Thin Liquid Layer microcell) incorporated herein by reference, it may be desirable to perform electroplating operations in a thin liquid layer, face up or down configuration, referred to internally as a "microcell" or "microgap" configuration.

The anodes used with this invention can be of either an inert or consumable type. The reactions of the consumable type (also referred to as active anodes) for plating copper are simple and balanced (no overall depletion or generation of new species). Copper ions in solution are reduced at the cathode and removed from the electrolyte, simultaneously as copper is oxidized at the anode and copper ions added to the electrolyte. The inert type (also referred to as "dimensionally stable" and non-reactive) provides unbalanced reactions and copper ions (or ions of any other metal being plated) must be added to plating solution.

Often it will be desirable to conduct the deposition or removal processes of this invention while the asymmetric electrode and work piece are in close proximity. In certain embodiments, the separation distance between the asymmetric electrode(s) (or the aperture(s) for virtual electrode(s)) and the work piece surface is not greater than about a characteristic length defined for the work piece (e.g., a work piece diameter). In certain embodiments, the separation distance is not greater than about one-half the characteristic length and in further embodiments, the separation distance is not greater than about one-quarter the characteristic length. For example, if the work piece is a 300 millimeter wafer, the separation distance the last embodiment would not be greater than about 75 millimeters. In other embodiments, the separation distance would not be greater than about 150 millimeters or 300 millimeters.

Periodic Sequential Activation

A further embodiment of the invention is depicted in FIGS. 8 through 13. In this embodiment, sequential activation or sequential variation of electrodes is provided in periodic manner, following the period of rotation of a work piece or an associated electrode assembly. Aside from the specific features described in this section, the embodiment may employ any feature, operation, or operation described above. This embodiment allows for correction of large-scale non-uniformities, which may vary azimuthally as well as radially. In this embodiment, a pattern of removal (or deposition) is set up by a pattern of electrodes (an electrode assembly); this pattern of removal is made to rotate by applying a variable voltage (or current) to each electrode. In depicted embodiments, the rotation rate is equal to that of the wafer.

Figure 8:
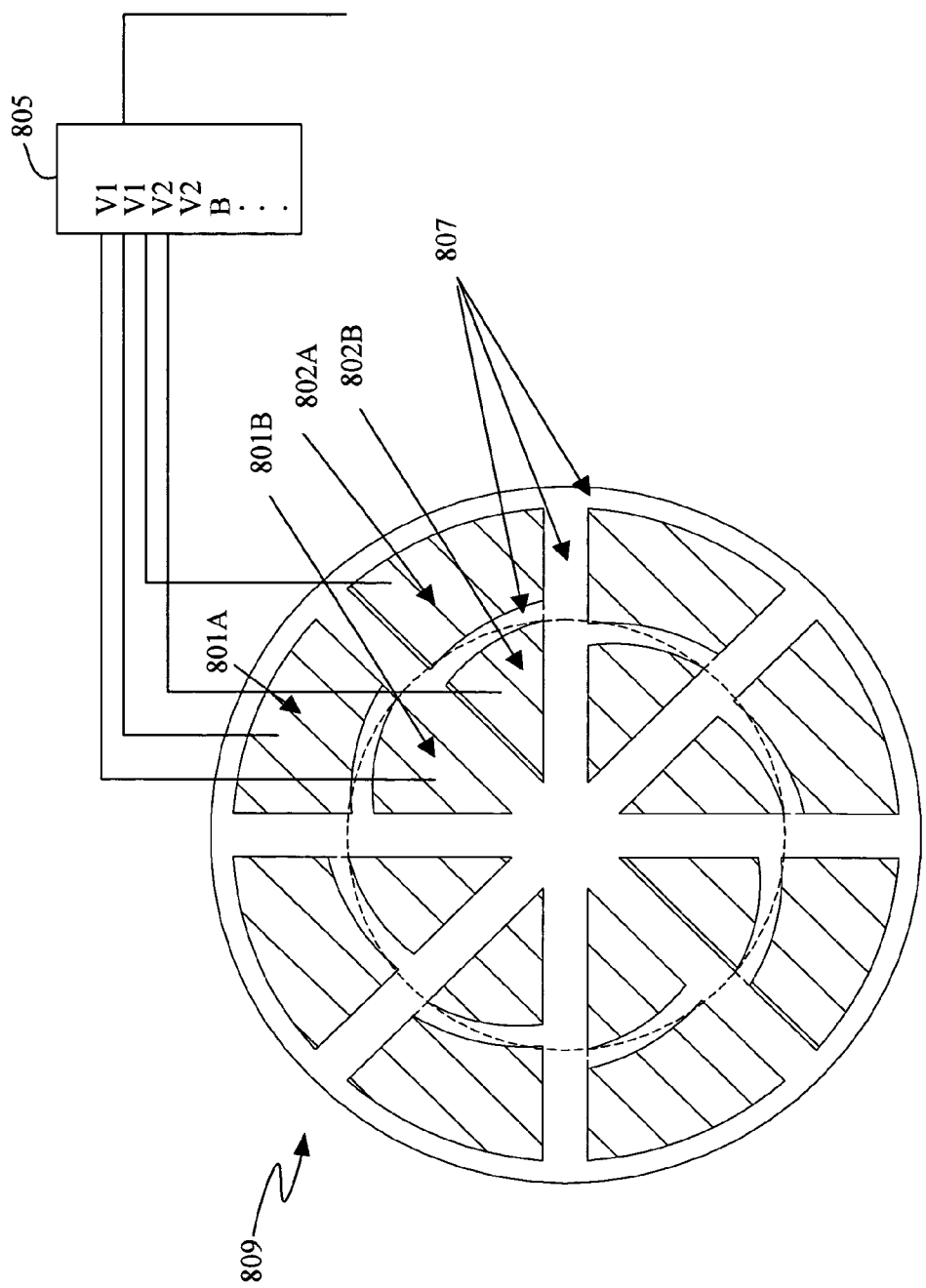
FIG. 8 is schematic illustration of an electrode assembly and associated power supply for providing sequential activation of electrodes in periodic manner, following the period of rotation of a work piece or the electrode assembly.

An example will help illustrate these embodiments. Assume that increasing the current to one electrode enhances the removal rate (or deposition rate) at a region of the work piece across from the electrode with the increased current. This might be desirable because the copper on the wafer is determined by metrology to be thicker in that location. Referring to FIG. 8, an electrode assembly 809 includes multiple wedge and arc-shaped electrode segments separated by insulators 807. Two of the arc-shaped segments are indicated by reference numbers 801A and 801B. Two of the wedge-shaped segments are indicated by reference numbers 802A and 802B. A power source 805 provides power separately to each of the electrode segments in assembly 809. In this manner, specific current and/or voltage is provided on a per electrode basis. Power source 805 also provides power to a work piece (e.g., a wafer not shown in this figure). In the depicted embodiment, the power delivered to individual electrode segments is varied by controlling the voltage provided via power source 805.

Figure 9B:
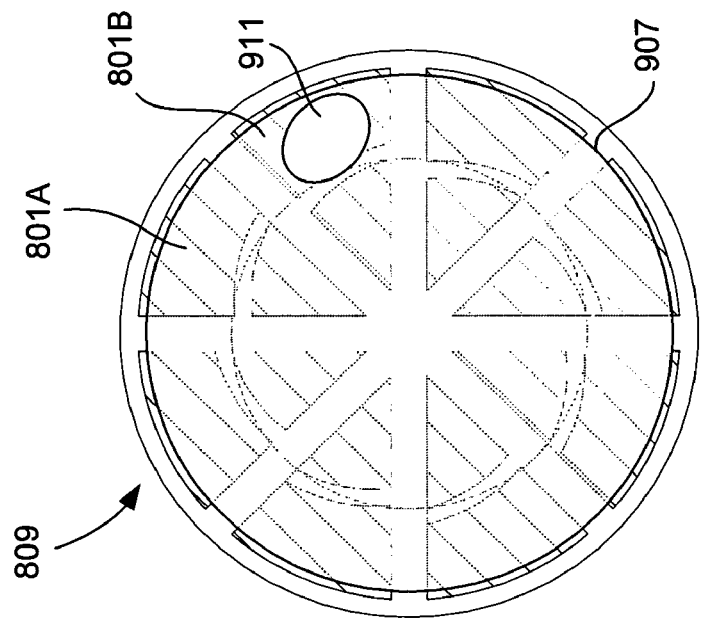
FIGS. 9A and 9B are schematic illustrations as in FIG. 8 but depicted the sequential activation and its use to process a thick region on a wafer work piece.
Figure 9A:
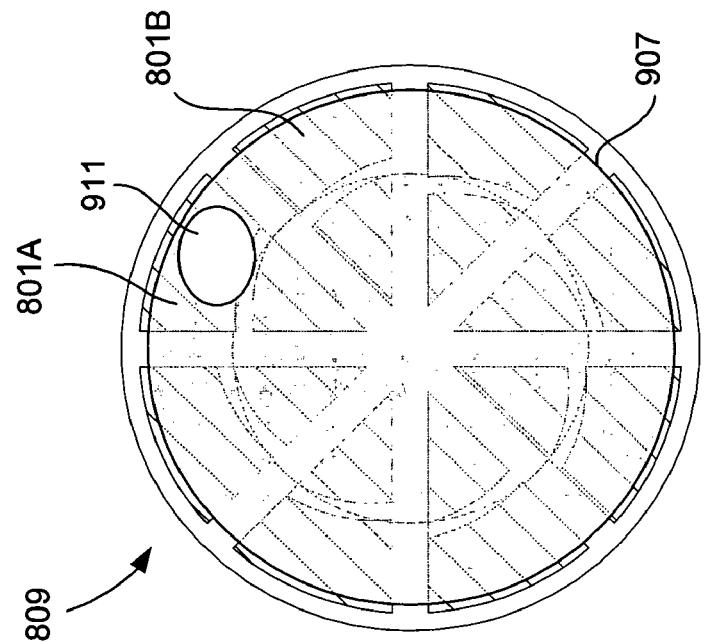

The following example is provided to further illustrate this aspect of the invention. Suppose that the power provided to electrode segment 801A from source 805 is normally at a current VIA but is temporarily increased to an amount VH to allow for additional material removal at a region of the work piece opposite segment 801A. Also assume for simplicity all other electrodes remain at their original current level. The situation is shown in FIG. 9A where a wafer 907 (shown as a transparent overlay) has a thick region 911 and individual electrodes of electrode assembly 809 are sequentially varied in current or voltage to process a thick region on a wafer work piece. Wafer 907 is rotating, however, so in order to maintain a high removal rate at the thick spot 911, the electrodes with providing extra power are varied to follow the rotating thick spot. This can be seen to be done if, after wafer 907 rotates 45 degrees clockwise as shown in FIG. 9B, the current levels to the electrodes are modified, so that now V2A=VH while the other electrodes are at VA. The entire electrode assembly 809 has effectively been rotated as shown in FIG. 9B.

Figure 10:
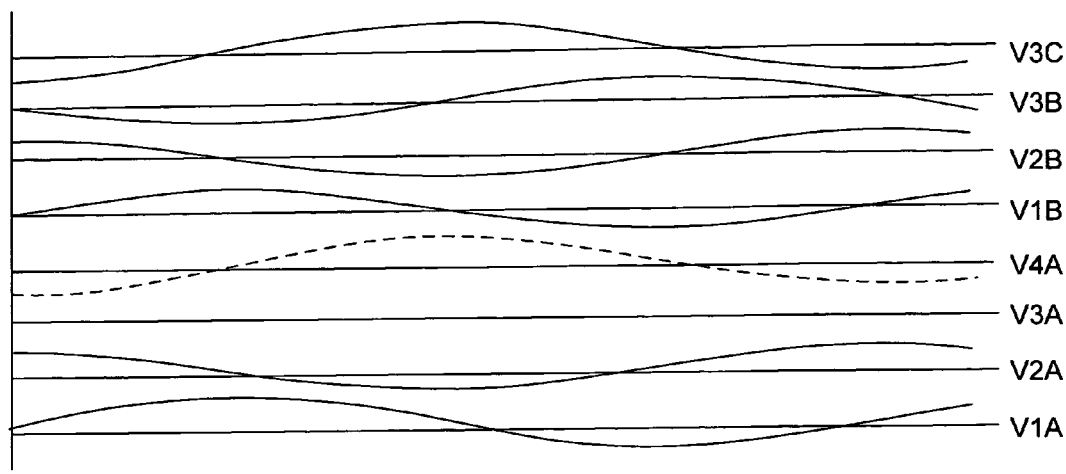
FIG. 10 is a set of electrode activation waveforms for sinusoidally activating individual electrodes in an assembly such as that shown in FIG. 8.

In certain embodiments, the above-described simple switching protocol is replaced with a more complex switching protocol. FIG. 10 shows a possible pattern of removal rates changes. These changes would normally be superimposed on a background rate. In this case the rate changes are sinusoidal. The rates in FIG. 10 are intended to be average rates, in the sense that the rate shown may be achieved for example by pulsing the current to the given segment with a certain duty cycle; the average rate shown in FIG. 10 is then taken over a period long compared with the pulse length but short compared with the rotation time of the wafer. The use of smoothly varying (on average) removal rates allows complex azimuthal variations of thickness to be corrected for by suitable selection of the removal rates. In certain embodiments, Fourier analysis techniques are used to relate the required removal rate patterns to the non-uniformity pattern to be corrected. In general, increasing the number of individual electrodes that are provided will enable control of the removal rate on a finer scale. However such an increase increases the cost of the system by increasing the complexity of the power supply required.

Figure 11:
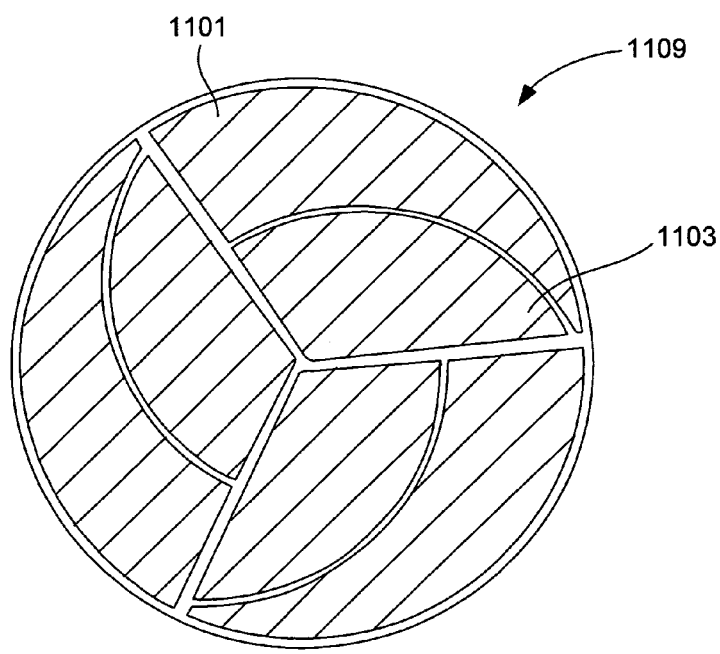
FIGS. 11-13 show various electrode segment configurations that may be employed in embodiments of this invention.
Figure 12:
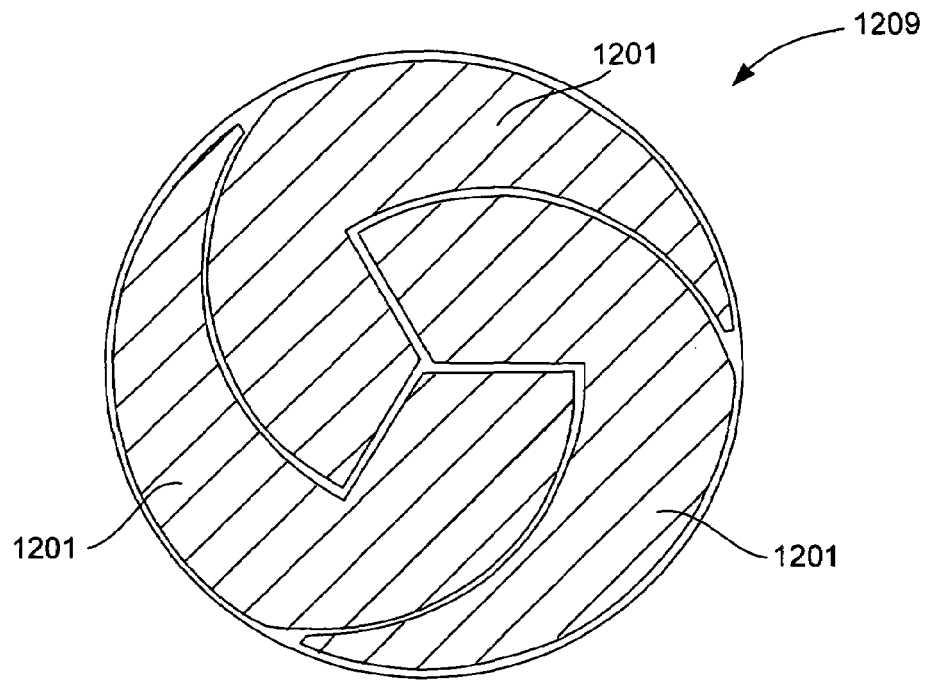
Figure 13:
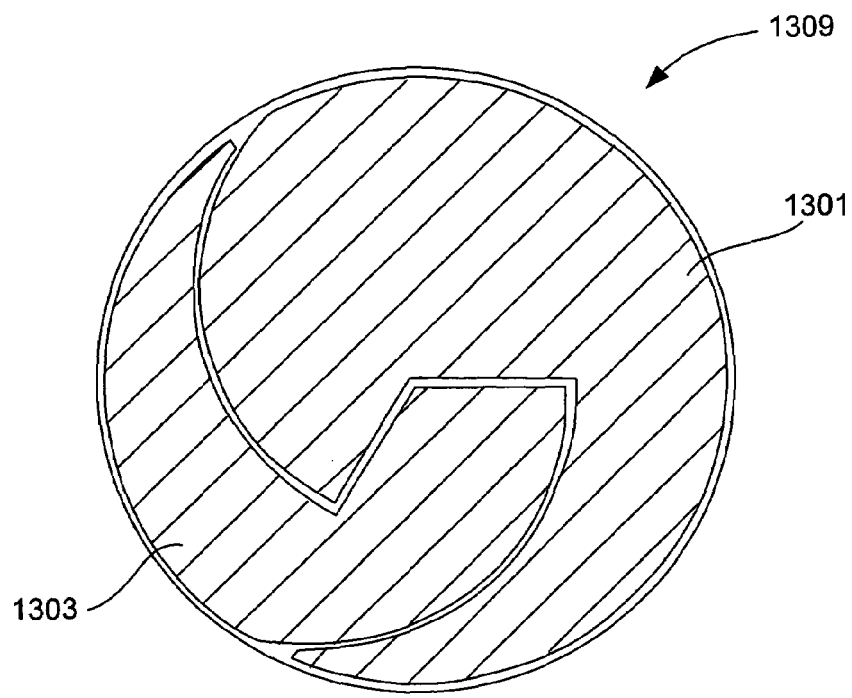

FIGS. 11-13 present various exemplary electrode configurations for use with the embodiment. FIG. 11, in comparison to FIG. 8, has the number of segments reduced to six and they have different azimuthally asymmetric shapes (comma 1101 and round-base triangular 1103) within an electrode assembly 1109. Note that in both FIG. 8 and FIG. 11, the boundary between two segments in the same 'pie slice' (wedge) is not at a constant radius but is swept; this avoids the appearance of artifacts of low removal rate (or deposition rate) associated with the gap (where no removal is occurring). In FIG. 12, the generality of the device is further reduced by employing an electrode assembly 1209 merging segments into repeated sickle-shaped electrodes 1201. In FIG. 13, two electrodes from assembly 1209 in FIG. 13 are merged to produce a highly simplified azimuthally asymmetric electrode assembly 1309 having a principal asymmetric electrode 1301 and a secondary asymmetric electrode 1303.

Accordingly these further embodiments allow fine-grained correction of incoming non-uniformities in both the azimuthal and radial directions, as needed, by plating or removing copper (or other material) at varying rates until an optimal profile is achieved. In a tool, the waveforms used to control power to individual asymmetric electrodes in an electrode assembly may be calculated based on a pre-measured map of the incoming wafer or on in-situ measurements of thickness.

Such mapping is often performed by measuring the sheet resistance of the copper film. Examples of suitable methods of measuring the metal non-uniformities dynamically and in-situ include (1) an eddy current non-contacting thickness probe (measuring a change in AC impedance of an inductive coil), (2) making a set (typically across different diagonals) of cross wafer resistance measurements (typically performed at high frequency and small amplitude AC signal with a set of four electrode in pairs (two create modulation and two to sense the response), and using a phase lock-in amplifier of the AC signal to measure the in-phase component), and (3) probing the wafer sheet resistance using AC modulation by having an uniform peripheral contact at the edge, scanning an reference electrode scanned in close proximity to the wafer surface to map out the profile. In either case, a sequence of electrode activations is determined that will best correct the radial and/or azimuthal non-uniformity in the work piece. Of course, as explained above, the invention can be employed to introduce a non-uniformity when the application dictates.

CONCLUSION

Although various details have been omitted for clarity's sake, various design alternatives may be implemented. Therefore, the present examples are to be considered as illustrative and not restrictive, and the invention is not to be limited to the details given herein, but may be modified within the scope of the appended claims.

The invention claimed is:

1. A method of electrochemically processing a metal layer on a work piece, the method comprising:
   (a) providing a reactor comprising an azimuthally asymmetric electrode;

(b) providing the work piece in the reactor at a position substantially aligned with the azimuthally asymmetric electrode;
(c) rotating at least one of the work piece and the azimuthally asymmetric electrode with respect to the other; and
(d) electrochemically processing the metal layer on the work piece while rotating to thereby provide a radially varying source of current over the period of rotation.

2. The method of claim 1, wherein the electrode has an azimuthally varying radius.

3. The method of claim 2, wherein the electrode radius varies gradually in the azimuthal direction.

4. The method of claim 1, wherein the electrode occupies a radially varying arc that is generally greater in a center region of the electrode than in an edge region of the electrode, as determined with respect to a region circumscribed by rotation about a center of rotation on the electrode.

5. The method of claim 1, wherein the electrode occupies an radially varying arc that is generally greater in an edge region of the electrode than in a center region of the electrode, as determined with respect to a region circumscribed by rotation about a center of rotation on the electrode.

6. The method of claim 1, wherein rotating at least one of the work piece and the azimuthally asymmetric electrode provides a radially varying current distribution, over a period of rotation, from the electrode in which a relative amount of current at or near a center of rotation for the electrode is greater than in the electrode periphery.

7. The method of claim 1, wherein rotating at least one of the work piece and the azimuthally asymmetric electrode provides a radially varying current distribution, over a period of rotation, from the electrode in which a relative amount of current at or near a center of rotation for the electrode is lesser than in the electrode periphery.

8. The method of claim 1, wherein the work piece is a semiconductor wafer and the metal layer is a seed layer covering a front side work surface of the wafer.

9. The method of claim 1, wherein the work piece is a semiconductor wafer and the metal layer is an overburden layer covering a front side work surface of the wafer.

10. The method of claim 1, wherein (d) comprises passing a current between the metal layer and the azimuthally asymmetric electrode whereby the current is distributed such that, over a period of rotation, the metal is deposited or removed substantially uniformly onto the entire surface area of the metal layer.

11. The method of claim 1, wherein (d) comprises passing a current between the metal layer and the azimuthally asymmetric electrode whereby the current is distributed such that, over a period of rotation, the metal is deposited or removed according to a non-uniform pattern on the metal layer.

12. The method of claim 1, further comprising providing one or more electrode segments, each isolated from each other and from the azimuthally asymmetric electrode so that they can deliver current independently of one another.

13. The method of claim 12, further comprising delivering current to an electrode segment only after the processing in (d) has taken place for a period of time.

14. The method of claim 12, further comprising removing current from an electrode segment after the processing in (d) has taken place for a period of time.

15. The method of claim 12, further comprising delivering current pulses to or from the electrode segment.

16. The method of claim 15, wherein a duty cycle of the current pulses increases over time such that a percentage of the total current attributable to the electrode segment increases over time.

17. The method of claim 15, wherein a duty cycle of the current pulses decreases over time such that a percentage of the total current attributable to the electrode segment decreases over time.

18. The method of claim 12, wherein (d) comprises distributing the current between the azimuthally asymmetric electrode and at least one other electrode segment to reduce, over time, non-uniformity in current delivered to the work piece.

19. The method of claim 12, wherein (d) comprises distributing the current between the azimuthally asymmetric electrode and at least one other electrode segment to increase, over time, non-uniformity in current delivered to the work piece.

20. An apparatus for electrochemically processing a metal layer on a work piece, the apparatus comprising:
(a) a reactor chamber;
(b) an azimuthally asymmetric electrode in the reactor chamber;
(c) a work piece holder for holding the work piece in the reactor at a position substantially in alignment with the azimuthally asymmetric electrode; and
(d) a mechanism for rotating at least one of the work piece and the azimuthally asymmetric electrode with respect to the other.

21. The apparatus of claim 20, wherein the electrode has an azimuthally varying radius.

22. The apparatus of claim 21, wherein the electrode radius varies gradually in the azimuthal direction.

23. The apparatus of claim 20, wherein the electrode occupies a radially varying arc that is generally greater in a center region of the electrode than in an edge region of the electrode, as determined with respect to a region circumscribed by rotation about a center of rotation on the electrode.

24. The apparatus of claim 20, wherein the electrode occupies a radially varying arc that is generally greater in an edge region of the electrode than in a center region of the electrode, as determined with respect to a region circumscribed by rotation about a center of rotation on the electrode.

25. The apparatus of claim 20, further comprising one or more electrode segments, each isolated from each other and from the azimuthally asymmetric electrode so that they can deliver current independently of one another.

26. The apparatus of claim 25, further comprising a control circuit for independently adjusting the current delivered to the azimuthally asymmetric electrode and each of the one or more electrode segments.

27. The apparatus of claim 26, wherein the control circuit is designed or configured to deliver current to an electrode segment only after first delivering current from the azimuthally asymmetric electrode for a period of time.

28. The apparatus of claim 26, wherein the control circuit is designed or configured to remove current to an electrode segment after delivering current to the electrode segment for a period of time.

29. The apparatus of claim 26, wherein there are two or more electrode segments.

30. The apparatus of claim 26, wherein the control circuit is designed or configured to deliver current pulses to the electrode segment.

31. The apparatus of claim 30, wherein the control circuit is designed or configured to adjust a duty cycle of the current pulses over time such that a percentage of the total current attributable to the electrode segment increases over time.

32. The apparatus of claim 30, wherein the control circuit is designed or configured to adjust a duty cycle of the current pulses over time such that a percentage of the total current attributable to the electrode segment decreases over time.

33. The apparatus of claim 20, wherein the work piece holder is designed to position the work piece in an electrolyte bath.

34. The apparatus of claim 20, further comprising an insulating focusing wall around the azimuthally asymmetric electrode to focus current from said asymmetric electrode in an electrolyte provided between the work piece and said asymmetric electrode during electrochemical processing.

35. The apparatus of claim 34, further comprising:
   an electrode segment isolated from the azimuthally asymmetric electrode so that the electrode segment and the asymmetric electrode can deliver current independently of one another; and
   an insulating focusing wall around the electrode segment to focus current from the electrode segment in the electrolyte.

36. A method of electroplating a layer of a metal onto a work piece, the method comprising:
   (a) providing a reactor comprising an azimuthally asymmetric anode;
   (b) providing the work piece in the reactor at a position substantially aligned with the azimuthally asymmetric anode;
   (c) rotating at least one of the work piece and the azimuthally asymmetric anode with respect to the other while contacting a plating solution containing ions of the metal; and
   (d) plating metal onto the work piece while rotating to thereby provide a radially varying source of current.

37. A method of electrolytically removing material from the surface of a work piece, the method comprising:
   (a) providing a reactor comprising an azimuthally asymmetric cathode;
   (b) providing the work piece in the reactor at a position substantially aligned with the azimuthally asymmetric cathode; and
   (c) rotating at least one of the work piece and the azimuthally asymmetric cathode with respect to the other while contacting an electrolyte to provide a radially varying current distribution at work piece and thereby electrolytically removing material from the work piece.

38. A method of electrochemically processing a work piece having a region that requires more or less processing than at least one other area on the work piece, the method comprising:
   (a) providing a reactor comprising an electrode assembly, the electrode assembly comprising multiple separate electrode segments having distinct radial and/or azimuthal positions;
   (b) providing work piece in the reactor at a position substantially aligned with the electrode assembly;
   (c) rotating at least one of the work piece and the electrode assembly with respect to the other; and
   (d) during rotation, sequentially adjusting the current and/or voltage provided to individual electrode segments in the assembly in a manner that follows the period of rotation and tracks the region on the work piece requiring more or less processing than at least one other area on the work piece.

39. The method of claim 38, wherein at least one of the electrode segments is azimuthally asymmetric.

40. The method of claim 38, wherein the electrochemically processing comprises removing material from the work piece.

41. The method of claim 38, wherein the electrochemically processing comprises plating material onto the work piece.

* * * * *